United States Patent
Edlund et al.

(10) Patent No.: US 9,860,325 B2
(45) Date of Patent: Jan. 2, 2018

(54) TUNNEL BROKER IN A SERVICE ORIENTED ARCHITECTURE

(71) Applicant: Axis AB, Lund (SE)

(72) Inventors: Björn Edlund, Löberöd (SE); Joachim Ståhl, Lund (SE); Joakim Roubert, Lund (SE); Mikael Ranbro, Eslöv (SE); Staffan Olsson, Furulund (SE); Ted Hartzell, Lomma (SE)

(73) Assignee: AXIS AB, Lund (SE)

( * ) Notice: Subject to any disclaimer, the term of this patent is extended or adjusted under 35 U.S.C. 154(b) by 122 days.

(21) Appl. No.: 14/218,601

(22) Filed: Mar. 18, 2014

(65) Prior Publication Data

US 2015/0271270 A1 Sep. 24, 2015

(51) Int. Cl.
| | |
|---|---|
| H04L 29/08 | (2006.01) |
| H04L 12/46 | (2006.01) |
| H04L 29/14 | (2006.01) |
| G06F 17/30 | (2006.01) |
| G06F 9/46 | (2006.01) |

(52) U.S. Cl.
CPC .............. *H04L 67/148* (2013.01); *G06F 9/46* (2013.01); *G06F 17/30* (2013.01); *H04L 12/46* (2013.01); *H04L 12/4633* (2013.01); *H04L 67/1002* (2013.01); *H04L 67/28* (2013.01); *H04L 67/1034* (2013.01); *H04L 69/40* (2013.01)

(58) Field of Classification Search
None
See application file for complete search history.

(56) References Cited

U.S. PATENT DOCUMENTS

| | | |
|---|---|---|
| 7,779,086 B1 | 8/2010 | Gammo et al. |
| 2002/0087707 A1 | 7/2002 | Stewart et al. |

(Continued)

FOREIGN PATENT DOCUMENTS

| | | |
|---|---|---|
| CN | 102083102 A | 6/2011 |
| CN | 103220735 A | 7/2013 |

OTHER PUBLICATIONS

Extended European Search Report dated Sep. 15, 2014 issued in corresponding EP Application 14161503.9, 7 pages.
Pramudianto, Ferry et al., "BEMO-COFRA—BrazilEurope MOnitoring and COntrol FRAmework," BEMO-COFRA Consortium, Jan. 30, 2011, pp. 1-89.
"LinkSmart Middleware," Nov. 25, 2013, <http://sourceforge.net/p/linksmart/wiki/LinkSmart%202.x%20documentation/>.

(Continued)

*Primary Examiner* — Kevin Bates
*Assistant Examiner* — Lesa Kennedy
(74) *Attorney, Agent, or Firm* — Snyder, Clark, Lesch & Chung, LLP

(57) ABSTRACT

A computer device includes logic configured to implement a tunnel broker. The tunnel broker is configured to receive a request from a client device for a service in a system, the service having a requested service property; select a first node in the system that hosts a first service instance having the requested service property; and establish a communication tunnel with a first end at the client device and a second end at the selected first node. The tunnel broker is further configured to determine that the first node no longer hosts the first service instance having the requested service property or that the first node has become unreachable; select a second node in the system that hosts a second service instance having the requested service property; and move the second end of the communication tunnel from the first node to the second node.

20 Claims, 14 Drawing Sheets

(56) References Cited

U.S. PATENT DOCUMENTS

| | | | | |
|---|---|---|---|---|
| 2003/0153296 A1* | 8/2003 | Mueller | ............. | H04L 12/4633 |
| | | | | 455/403 |
| 2006/0047742 A1* | 3/2006 | O'Neill | ................... | H04L 49/25 |
| | | | | 709/203 |
| 2008/0271008 A1* | 10/2008 | Dettori | ..................... | G06F 8/24 |
| | | | | 717/168 |
| 2011/0023090 A1* | 1/2011 | Asati | ................... | H04L 12/4633 |
| | | | | 726/4 |
| 2013/0347072 A1* | 12/2013 | Dinha | ................ | H04L 63/0272 |
| | | | | 726/4 |
| 2014/0059209 A1* | 2/2014 | Alnoor | ..................... | G06F 9/54 |
| | | | | 709/224 |

OTHER PUBLICATIONS

Zave, Pamela et al., "The Geomorphic View of Networking: A Network Model and Its Uses," Proceedings of the 7th Workshop on Middleware for Next Generation Internet Computing, Dec. 3-7, 2012, Montreal, pp. 1-6.

Lewin-Eytan, Liane et al., "Designing Modular Overlay Solutions for Network Virtualization," IBM Research Report, H-0316, Aug. 28, 2011, pp. 1-8.

Louati, Wajdi, "On-Demand Virtual Network Service for Dynamic Networks," Thesis of Universite Pierre et Marie Curie. Mar. 30, 2007, pp. 1-208.

Zeghlache, Djamal, "Dynamic networking and adaptation of wireless networks and services," Institut National des Telecommunications, 2006, pp. 1-12.

* cited by examiner

PROPERTY TABLE
460

| INSTANCE ID 462 | 6529 |
| --- | --- |
| INTERFACE 464 | STORAGE SERVICE |
| SERVICE FORMAT 468 | JSON |
| TRANSPORT PROTOCOL 470 | NODE PROTOCOL |
| CPU RANKING 472 | 20/100 |
| DISK SPACE 474 | 1 TB |
| RAM 476 | 2 GB |

TUNNEL BROKER IN A SERVICE ORIENTED ARCHITECTURE

FIELD

This disclosure generally relates to a tunnel broker in a service oriented architecture system.

BACKGROUND INFORMATION

A network of devices may communicate over a network and may form part of a system that provides an array of various services. Different devices may provide different services at different times and the system may need to keep track of which services are available at which devices. When a device is added, removed, or modified, for example, the configuration of the system changes. In a system with a large number of devices, this may result in frequent need for reconfiguration, which consumes system resources. Thus, keeping track of available services at different devices may be a challenging task.

SUMMARY

According to one aspect, a method, performed by a computer device, may include receiving, by the computer device, a request from a client device for a service in a system, the service having a requested service property; selecting, by the computer device, a first node in the system that hosts a first service instance having the requested service property; establishing, by the computer device, a communication tunnel between the client device and the selected first node, wherein the communication tunnel includes a first end at the client device and a second end at the first node; selecting, by the computer device, a second node in the system that hosts a second service instance having the requested service property; and moving, by the computer device, the second end of the communication tunnel from the first node to the second node.

Additionally, the method may include sending a search query that specifies the requested service property to a service registry, wherein the service registry includes a list of services available in one or more nodes of the system; receiving search results from the service registry, wherein the search results include a list of one or more nodes having the requested service property; and selecting the first node in the system that hosts the first service instance having the requested service property may include selecting the first node from the list of one or more nodes having the requested service property.

Additionally, the method may include determining that the communication tunnel should be updated; and selecting the second node in the system that hosts the second instance having the requested service property may be based on determining that the communication tunnel should be updated.

Additionally, determining that the communication tunnel should be updated may include re-sending the search query to the service registry at particular intervals; and receiving updated search results from the service registry, wherein the updated search results include an indication that the first node no longer hosts the first service instance having the requested service property or that the first service instance no longer has the requested service property.

Additionally, determining that the communication tunnel should be updated may include at least one of receiving an indication from the service registry that the first node no longer hosts the first service instance having the requested service property or that the first service instance no longer has the requested service property; receiving a message from the client device that the first node is unreachable; or receiving a message from the first node that the first node is unable to provide the first service to the client device.

Additionally, determining that the communication tunnel should be updated may include determining that another node in the system is a better match for the requested service property; and selecting the second node in the system that hosts the second instance having the requested service property may be based on determining that another node in the system is a better match for the requested service property.

Additionally, determining that another node in the system is a better match for the requested service property may include re-sending the search query to the service registry at particular intervals; and receiving updated search results from the service registry, wherein the updated search results include an indication that another node in the system is a better match for the requested service property.

Additionally, determining that another node in the system is a better match for the requested service property may include receiving an indication from the service registry that the second node hosts the second service instance, wherein the second service instance is a better match for the requested service property.

Additionally, the method may include determining one or more network connection metrics for a connection from the client device to particular nodes of the nodes included in the list of one or more nodes having the requested service property; and selecting the first node from the list of one or more nodes having the requested service property may be based on the determined one or more network connection metrics.

Additionally, moving the second end of the communication tunnel from the first node to the second node may be done transparently with respect to the client device.

Additionally, the requested service property may include one or more of a particular service interface; a particular operating system associated with the service; a particular processing capacity associated with the service; a particular storage capacity associated with the service; a particular bandwidth associated with the service; a particular location associated with the service; a particular codec associated with the service; a particular domain associated with the service; or a particular security level associated with the service.

According to another aspect, a computer device may include logic configured to implement a tunnel broker configured to receive a request from a client device for a service in a system, the service having a requested service property; select a first node in the system that hosts a first service instance having the requested service property; establish a communication tunnel between the client device and the selected first node, wherein the communication tunnel includes a first end at the client device and a second end at the first node; select a second node in the system that hosts a second service instance having the requested service property; and move the second end of the communication tunnel from the first node to the second node.

Additionally, the tunnel broker may be further configured to send a search query that specifies the requested service property to a service registry, wherein the service registry includes a list of services available in one or more nodes of the system; receive search results from the service registry, wherein the search results include a list of one or more nodes having the requested service property; and wherein, when selecting the first node in the system that hosts the first service instance having the requested service property, the tunnel broker may be further configured to select the first node from the list of one or more nodes having the requested service property.

Additionally, the tunnel broker may be further configured to determine that the communication tunnel should be updated; and the tunnel broker may be configured to select the second node in the system that hosts the second instance having the requested service property based on determining that the communication tunnel should be updated.

Additionally, when determining that the communication tunnel should be updated, the tunnel broker may be further configured to re-send the search query to the service registry at particular intervals; and receive updated search results from the service registry, wherein the updated search results include an indication that the first node no longer hosts the first service instance having the requested service property or that the first service instance no longer has the requested service property.

Additionally, when determining that the communication tunnel should be updated, the tunnel broker may be further configured to at least one of receive an indication from the service registry that the first node no longer hosts the first service instance having the requested service property or that the first service instance no longer has the requested service property; receive a message from the client device that the first node is unreachable; or receive a message from the first node that the first node is unable to provide the first service to the client device.

Additionally, when determining that the communication tunnel should be updated, the tunnel broker may be further configured to determine that another node in the system is a better match for the requested service property; and the tunnel broker may be configured to select the second node in the system that hosts the second instance having the requested service property based on determining that another node in the system is a better match for the requested service property.

Additionally, when determining that another node in the system is a better match for the requested service property, the tunnel broker may be further configured to receive an indication from the service registry that the second node hosts the second service instance, wherein the second service instance is a better match for the requested service property.

Additionally, the tunnel broker may be configured to move the second end of the communication tunnel from the first node to the second node transparently with respect to the client device.

According to yet another aspect, a computer device may include logic configured to implement a tunnel broker configured to receive a request from a client device for a service in a system, the service having a requested service property; send a search query that specifies the requested service property to a service registry, wherein the service registry includes a list of services available in one or more nodes of the system; receive search results from the service registry, wherein the search results include a list of one or more nodes having the requested service property; select a first node in the system that hosts a first service instance having the requested service property from the list of one or more nodes having the requested service property; establish a communication tunnel between the client device and the selected first node, wherein the communication tunnel includes a first end at the client device and a second end at the first node; determine that the that the first node no longer hosts the first service instance having the requested service property or that the first node has become unreachable; select a second node in the system that hosts a second service instance having the requested service property, in response to determining that the first node no longer hosts the first service instance having the requested service property or that the first node has become unreachable; and move the second end of the communication tunnel from the first node to the second node transparently with respect to the client device.

DETAILED DESCRIPTION OF PREFERRED EMBODIMENTS

Figure 1:
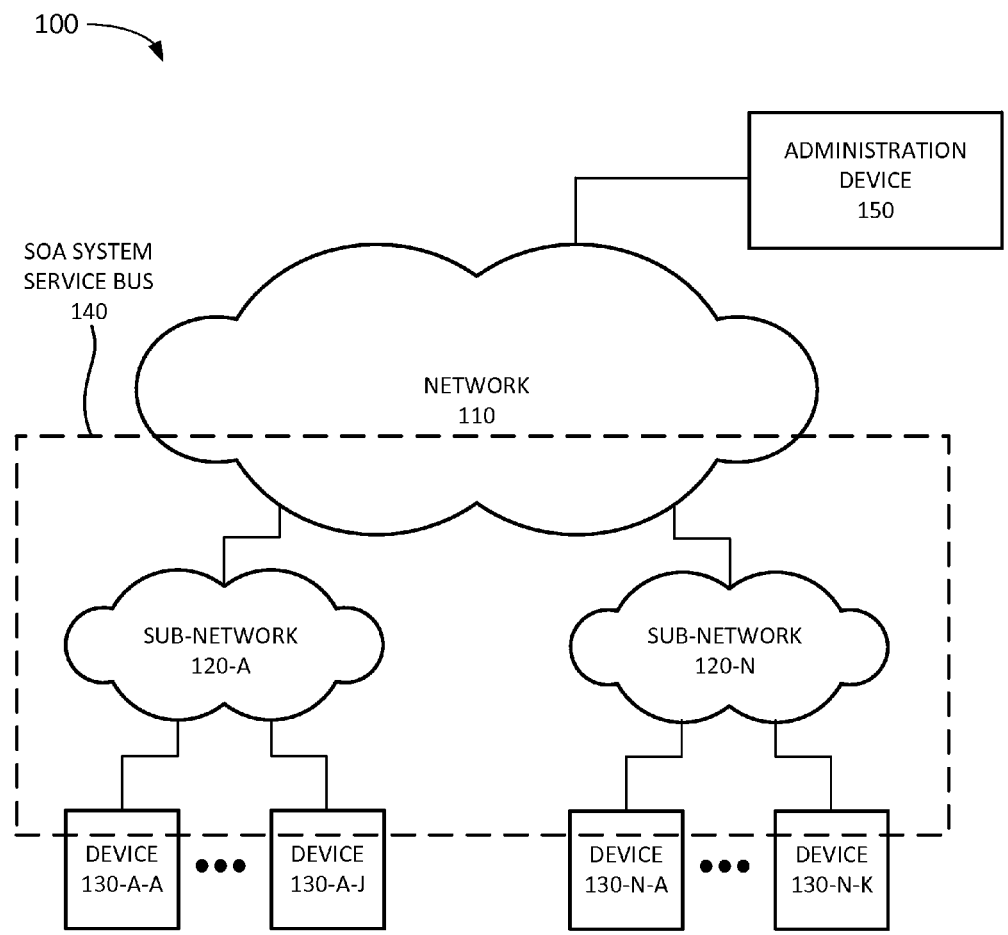
FIG. 1 is a block diagram illustrating an exemplary environment according to one or more embodiments described below.

The following detailed description refers to the accompanying drawings. The same reference numbers in different drawings identify the same or similar elements.

A system, such as a surveillance system, may include a large number of devices that can provide services. If a client device requests a particular service, a tunneling protocol may be used to encapsulate traffic via a communication tunnel between the client device and a device providing the service. A tunnel can be set up manually by the client device or by a tunnel broker that selects the endpoints of the tunnel and establishes the tunnel between the endpoints. In order to establish the tunnel, the client device or the tunnel broker needs to know the topology of the network. For example, the client device may need to know the network address of the device providing the service and will request a tunnel to be set up between the network address of the client device and the network address of the device providing the service.

Thus, the client device may first need to determine the network address of the device providing the service. Furthermore, if the device providing the service becomes unavailable, if the service becomes unavailable, or if the properties of the service change, the client device may need to locate another device in the system that provides the service, may need to determine the network address of the new device, and may need to request the tunnel broker to set up a new communication tunnel to the new device. In a system with a large number of devices with changing service capabilities, such a process may be slow and consume a large number of resources.

Implementations described herein relate to a tunnel broker in a system based on a service oriented architecture (SOA). In system based on a SOA, functionality is discretized into services. A service is a self-contained cohesive unit of functionality. Communication with a service is performed through a service interface that has a defined message format. The communication process is independent of the implementation of the service. The service may provide end user functionality and the service interface may be designed to be understandable by business people. Furthermore, each service is independent of other services and the boundaries of the service are explicit. Thus, if one service crashes, other services will not be affected. Therefore, each service may run as a different process, for example.

Services provided by a node in the system are stored in a service registry. The service registry stores properties for each service, such as a service identifier, an operating system associated with the service, location coordinates of the node on which the service is running, processing capacity associated with the service, bandwidth capacity associated with the service, and/or other types of properties associated with the service. Not all nodes in the system may include a service registry. Thus, some service registries may store services available at other nodes in the system. Furthermore, service registries in the system may be topologically interconnected and a second service registry may be accessible through a first service registry. If the first service registry receives a search query and does not identify a match for the search query, the first service registry may forward the search query to the second service registry. Thus, to a client submitting a search query to locate a service, the service registries in the system may appear as a single distributed service registry.

The SOA system includes a tunnel broker. The tunnel broker is configured to establish and manage a communication tunnel from a client device to a service having a requested service property. The communication tunnel may have a first end at the client device and a second end at a device providing the service having the requested service property. The tunnel broker may change the device at the second end of the communication tunnel in a manner transparent to the client device. For example, instead of requesting a communication tunnel based on network addresses or device identifiers (e.g., a tunnel between network address 12.11.1.43:1233 and network address 143.223.123.1:22), a client may request a communication tunnel between a service host with a service property VIDEO_MONITORING_SERVICE and a service host with a service property CAMERA_FRONT_DOOR. The tunnel broker may identify a device with the service property CAMERA_FRONT_DOOR and may set up a communication tunnel to the client device (e.g., the VIDEO_MONITORING_SERVICE host). The client device may not be aware of the actual network address or device identifier of the device providing the CAMERA_FRONT_DOOR service. Furthermore, if the device providing the CAMERA_FRONT_DOOR service becomes unavailable or stops hosting the service, the tunnel broker may identify another device in the system that host a service with the requested CAMERA_FRONT_DOOR service and may switch the second end of the communication tunnel to the other device transparently with respect to the client device.

The tunnel broker may receive a request from a client device for a service having a requested service property and may send a search query to a service registry for a list of system nodes that host a service with the requested service property. The service property may specify a particular service interface, a particular operating system, a particular processing capacity, a particular storage capacity, a particular bandwidth and/or bitrate, a particular location, a particular codec, a particular network domain, a particular security level, and/or another type of service property. The request may specify multiple requested service properties. Thus, the phrase "requested service property" may refer to multiple requested service properties. The service registry may return a list of one or more system nodes that host a service instance with the requested service property or properties and the tunnel broker may select one of the system nodes from the list. The system node may be selected based on the best match to the requested service property or properties and/or based on other factors, such as connection metrics. For example, if two nodes host a service instance with the requested property and one of the nodes has a higher quality connection to the client device, the tunnel broker may select the node with the higher quality connection.

The tunnel broker may establish a communication tunnel with a first end at the client device and the second end at the selected system node providing the requested service. The tunnel may be set up using, for example, Tunnel Setup Protocol (TSP). After the communication tunnel is set up, the tunnel broker may determine that the communication tunnel should be updated. As an example, the tunnel broker may re-send the search query to the service registry at particular intervals and may receive updated search results from the service registry. The updated search results may indicate that the selected system node is not available, that the selected system node no longer hosts the service, that the properties of the hosted service no longer match the requirements of the requested service property, and/or that another system node hosts a service instance that better matches the requirements of the requested service property.

As another example, the tunnel broker may receive an update from the service registry without re-sending the search query. For example, the tunnel broker may set up a subscription for changes to service matching the search query and the service registry may send periodic updates to the tunnel broker. As yet another example, the tunnel broker may receive a message from the client device that the selected node is not reachable via the communication tunnel or may receive a message from the selected node that the selected node is no longer hosting the requested service.

In response to determining that the communication tunnel should be updated, the tunnel broker may select another node that hosts a service instance with the requested service property and may move the second end of the communication tunnel from the first selected node to the second selected node. The client device may continue to use the service without detecting that the tunnel broker has moved the second end of the communication tunnel.

In some implementations, a one-to-many communication tunnel may be established and maintained by the tunnel broker. For example, a client device may request a communication tunnel to a particular number of service instances having a requested service property. Thus, tunnel broker may set up a communication tunnel with a first end at the client device and with multiple second sends, each second end being connected to a particular service instance having the requested property.

Thus, with the use of the tunnel broker as described herein, a client device using or accessing a service has to only provide specifications for the service, without needing to discover or provide a network address for the service in order to establish a communication tunnel. If the service fails at a first device, the second end of the tunnel is moved to a second device that hosts the service without interruption to the client device and without the client device discovering that the second end of the tunnel has been moved. In fact, the client device may not even be aware that the client device is accessing the service through a communication tunnel.

FIG. 1 is a block diagram of an exemplary environment 100 in which the systems and/or methods described can be implemented. As shown in the embodiment of FIG. 1, environment 100 includes a network 110, sub-networks 120-A to 120-N (referred to collectively as "sub-networks 120" and individually as "sub-network 120"), devices 130-A-A to 130-N-K (referred to collectively as "devices 130" and individually as "device 130"), and administration device 150. Device 130-N-K refers to the Kth device 130 in sub-network 120-N. In this embodiment, the components in environment 100 form a service-oriented architecture (SOA) system service bus 140.

Network 110 enables sub-networks 120 and/or devices 130 to communicate with each other. Network 110 may include one or more circuit-switched networks and/or packet-switched networks. For example, in one embodiment, network 110 includes a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

Sub-network 120 may include a LAN (e.g., a Layer 2 network) and/or a private network (e.g., a Layer 3 network). Sub-network 120 may interconnect one or more devices 130. For example, sub-network 120-A may interconnect devices 130-A-A to 130-A-J. Device 130 may include any device configured to communicate via SOA system service bus 140, for example.

Device 130 may include a server computer device, such as a Hypertext Preprocessor (PHP) server device, a C program server device, a Linux server device, a Windows server device, and/or another type of server device; a personal computer device, such as a desktop, laptop, tablet, a mobile communication device, and/or another type of personal computer device running Windows, Linux, Android, iOS, and/or another operating system; a monitoring device, such as a visible light camera, an infrared (IR) camera, a heat signature camera; a microphone; an alarm sensor, such as a motion sensor, a heat sensor, a pressure sensor, and/or another type of alarm sensor; a microcontroller computer device; and/or another type of computer device. While devices 130 are shown as connected to a sub-network 120, a particular device 130 may connect directly to network 110.

In one embodiment, SOA system service bus 140 is implemented between devices 130 on top of an existing network topology. SOA system service bus 140 may enable different types of devices 130, and/or devices 130 implemented using different platforms, to communicate using a service oriented architecture. SOA system service bus 140 may enable a first device 130 to request a particular service from any device 130 (e.g., itself or another device 130). Thus, a client (e.g., itself a "service" or a "client service") hosted by first device 130 may call upon a service hosted by a second device 130 (e.g., when the service is not available in first device 130). A first service (e.g., in first device 130) that requests another service (e.g., in second device 130) is referred to as a "client" or a "client service" as having initiated the request. The first service may also provide services to other services in the network, for example.

In one embodiment, a service is accessed via a standardized service interface. Each type of service may be associated with a particular service interface (e.g., a different service interface). A client requesting a service may thus communicate with a service interface and the client may be agnostic with respect to the actual implementation of the service. In other words, implementations of services communicate with each other using protocols defined by the service interfaces so that each implementation does not have to be concerned with the others' implementations. A running service implementation, associated with a particular service interface, may be referred to as a service instance. A device 130 that includes a service host (e.g., a device that hosts a service) may keep track of available service instances with a service registry (e.g., a list or database of services). SOA system service bus 140 may enable communication between devices 130 to locate a requested service by searching service registries of service hosts in devices 130.

Administration device 150 may enable an administrator to configure or otherwise manage SOA system service bus 140. For example, administration device 150 may include a portable communication device (e.g., a mobile phone, a smart phone, a phablet device, a global positioning system (GPS) device, and/or another type of wireless device); a personal computer or workstation; a server device; a laptop, tablet, or another type of portable computer; and/or any type of device with communication capability.

Like network 110, sub-network 120 may include one or more circuit-switched networks and/or packet-switched networks. For example, sub-network 120 may include a LAN, a WAN, a MAN, a PSTN, an ad hoc network, an intranet, the Internet, a fiber optic-based network, a wireless network, and/or a combination of these or other types of networks.

Although FIG. 1 shows exemplary components of environment 100, in other implementations, environment 100 may include fewer components, different components, differently arranged components, or additional components than depicted in FIG. 1. Additionally or alternatively, any one device in environment 100 (or any group of devices) may perform functions described as performed by one or more other devices in environment 100.

Figure 2:
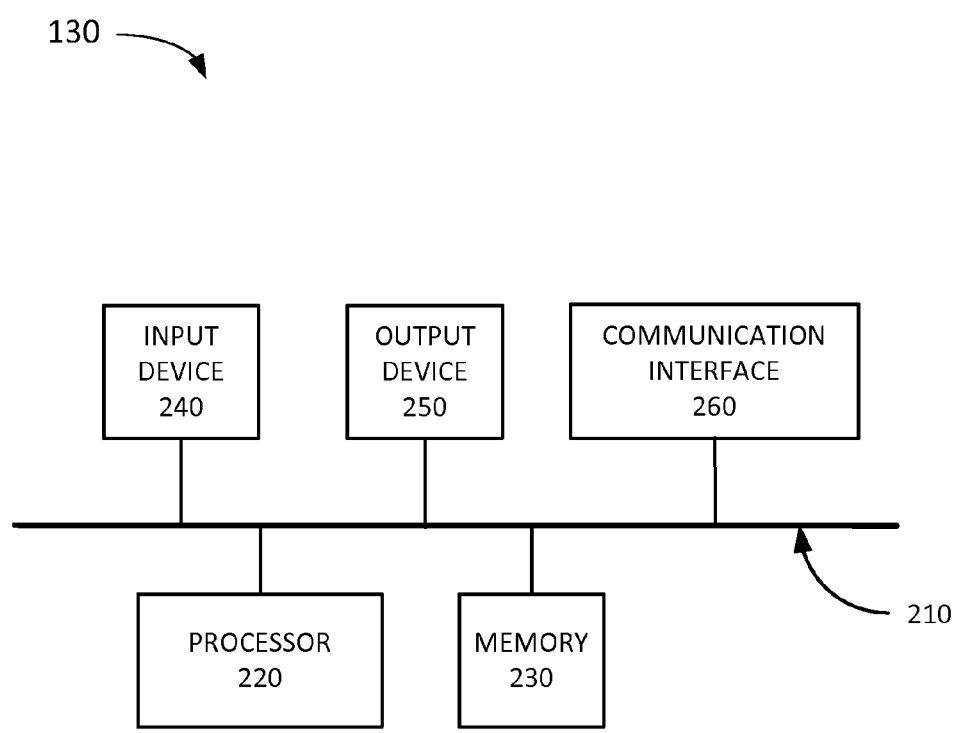
FIG. 2 is a block diagram illustrating exemplary components of a device of FIG. 1.

FIG. 2 is a block diagram illustrating exemplary components of device 130. As shown in FIG. 2, device 130 may include a bus 210, a processor 220, a memory 230, an input device 240, an output device 250, and a communication interface 260.

Bus 210 may include a path that permits communication among the components of device 130. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of volatile and/or dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 130. Input device 240 may include, for example, a keyboard, a mouse, a pen, a microphone, a remote control, an audio capture device, an image and/or video capture device, a touch-screen display, and/or another type of input device. In one embodiment, device 130 may be managed remotely and may not include input device 240. In other words, device 130 may be "headless" and may not include a keyboard, for example.

Output device 250 may output information to an operator of device 130. Output device 250 may include a display, a printer, a speaker, and/or another type of output device. For example, device 130 may include a display, which may include a liquid-crystal display (LCD) for displaying content to the customer. In one embodiment, device 130 may be managed remotely and may not include output device 250. In other words, device 130 may be "headless" and may not include a display, for example.

Communication interface 260 may include a transceiver (e.g., a transmitter and/or a receiver) that enables device 130 to communicate with other devices and/or systems. Communications interface 260 may communicate via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As described below, device 130 may perform certain operations relating to a tunnel broker configured to establish and manage a communication tunnel based on a requested service property. Device 130 may perform these operations in response to processor 220 executing software instructions contained in a computer-readable medium, such as memory 230. A computer-readable medium includes a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired (e.g., fixed) circuitry may be used in place of, or in combination with, software instructions to implement processes described herein. Thus, implementations described herein are not limited to any specific combination of hardware circuitry and software.

Although FIG. 2 shows exemplary components of device 130, in other implementations, device 130 may include fewer components, different components, additional components, or differently arranged components than depicted in FIG. 2. Additionally or alternatively, one or more components of device 130 may perform one or more tasks described as performed by one or more other components of device 130. Administration device 150 may be configured similarly as device 130.

Figure 3:
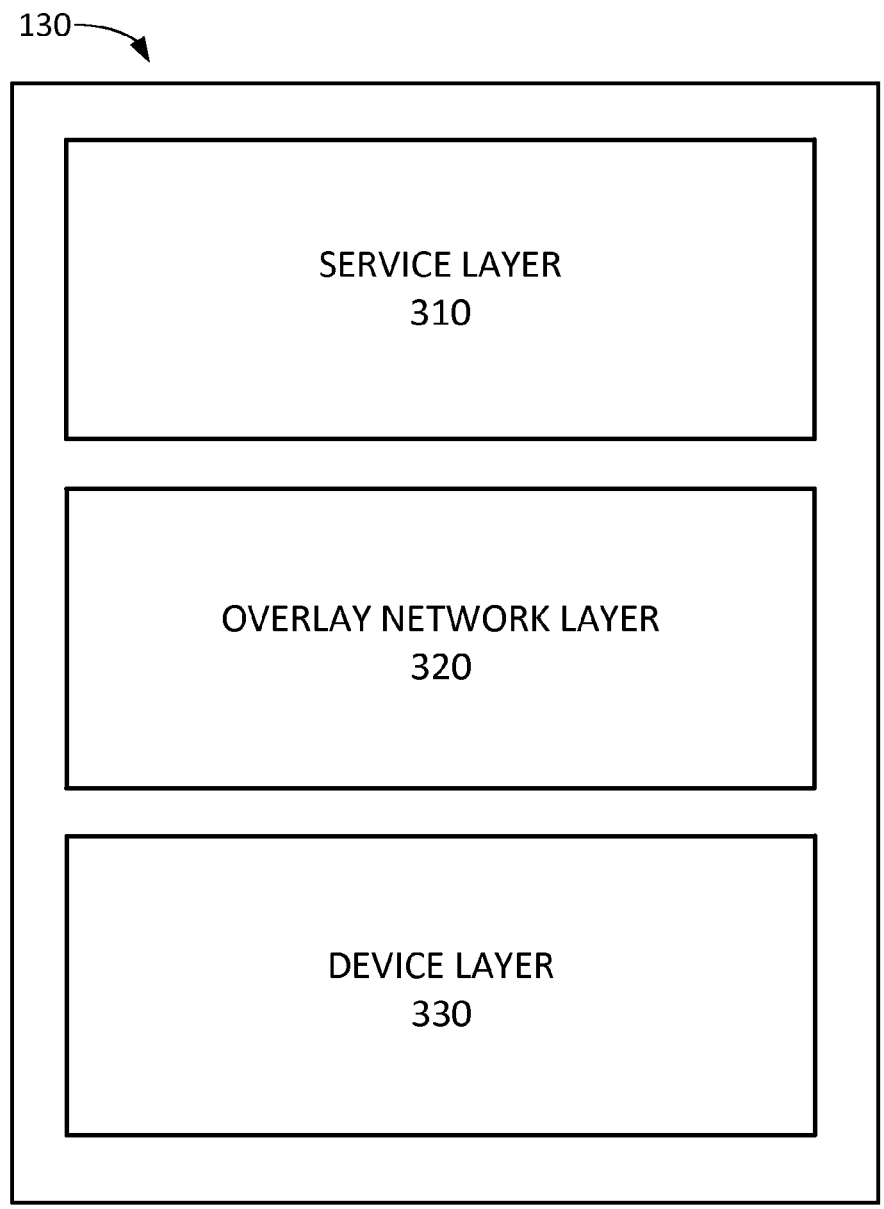
FIG. 3 is a block diagram illustrating exemplary functional layers of a device of FIG. 1.

FIG. 3 is a block diagram illustrating exemplary communication layers of device 130. The functional components of device 130 may be implemented, for example, by processor 220 executing instructions from memory 230. Additionally or alternatively, the functional components of device 130 may be implemented via hardwired (e.g., fixed) circuitry of one or more ASICs. As shown in FIG. 3, device 130 may include a service layer 310, an overlay network layer 320, and a device layer 330.

Service layer 310, in one embodiment, enables clients to search for service instances of a particular service type and enables clients to send requests to particular service instances. A service may be accessed via a standardized service interface that, in one embodiment, is agnostic to the actual implementation of the service. A service instance may be associated with explicit boundaries. In this embodiment, a particular process running on device 130, and/or particular data stored on device 130, either resides within the service instance or outside of the service instance without ambiguity. A service instance may be autonomous with respect to other service instances. For example, a particular service instance may be modified (e.g., code may be rewritten) without negatively impacting other service instances interacting with the particular service instance. A service may share a schema and/or a contract with other service instance (of the same type or of different type), but, in one embodiment, does not share the service implementation. A schema specifies the format and content of messages sent or received by the service interface. A contract specifies permissible sequences of messages sent or receive by the service interface.

One or more services may be deployed together as a bundle. A bundle may correspond to service that functions as a deployment unit in the system. A node in the system that is able to deploy a particular bundle, corresponding to a grouping of one or more services, functions as a bundle host. A bundle repository service may store a collection of bundles in the system. Thus, when service manager select to deploy a service, the service manager may need to locate a bundle host that is able to deploy a bundle associated with the service. The service manager may contact the service registry to locate the bundle repository service. The service manager may then contact the bundle repository service to identify a bundle. The service manager may select a bundle and may then search the service registry to identify a suitable bundle host that may deploy the selected bundle. The service manager may then contact the bundle host and may instruct the bundle host to deploy the bundle associated with the service.

Overlay network layer 320, in one embodiment, implements an overlay network on top of an existing network topology. Overlay network layer 320 may be responsible for routing traffic through firewalls and/or dealing with network address translation (NAT) in the underlying network topology. In one embodiment, the overlay network topology (e.g., which may be different than the underlying network topology) includes nodes organized in a tree structure. The overlay network topology logically connects the nodes. In other embodiments, the overlay network topology may include a different type of structure (e.g., a mesh topology). Each service host in a device 130 may correspond to a node in the overlay network and may be assigned a node identifier (ID). As noted above, a device 130 may include multiple service hosts and/or multiple nodes. Device 130 may be described as including one host that corresponds to one node. The nodes may be connected via the network topology, such as a routing tree, and a node may send a message to another node via the routing tree. In one embodiment, a node may send a message to another node via the underlying network topology without the message traversing the overlay network topology. Each node may store information (e.g., addresses of the underlying network, such as network 110) to reach its neighbors in the overlay network (as well as the underlying network). Overlay network layer 320 may correspond to a communication layer between the nodes and may use multiple network topologies to realize a particular function. For example, when searching service registries for a particular type of service, overlay network layer 320 may traverse edges of a tree of nodes while searching through service registries. In one embodiment, when sending a message from a first node to a second node, overlay network layer 320 may send the message directly from the first node to the second node, rather than by following edges of the tree. Overlay network layer 320 may provide node IDs to service layer 310 and service layer 310 may send messages to particular node IDs without needing to know the underlying network topology.

In one embodiment, device layer 330 performs device discovery during initial installation of SOA system service bus 140. Device layer 330 and/or overlay network layer 320 may also perform node discovery subsequent to initial installation, and/or may rediscover lost nodes that went offline and that re-join the overlay network at a later time. In one embodiment, overlay network layer 320 manages a shared secret for the overlay network, such as a certificate, that enables the nodes to verify each other's identity. Overlay network layer 320 may form a topology (e.g., a routing tree or mesh) for the overlay network based on one or more metrics of nearness. However, a message from a first node to a second node need not traverse the routing tree and may instead be sent directly from the first node to the second node. In another embodiment, the message from the first node to the second node traverses the routing tree. Furthermore, overlay network layer 320 may send multicast messages based on multicast groups. Moreover, overlay network layer 320 may provide a quality of service (QoS) guarantee to service layer 310.

While network layer 320 generally deals with "nodes," device layer 330 generally deals with "devices." Device layer 330 corresponds to the lower levels of functionality of device 130, including functionality required to communicate using the underlying network topology (e.g., network 110 and/or sub-network 120). For example, in some implementations, device layer 330 may implement Layers 1 through 6 of the Open Systems Interconnection (OSI) model (e.g. the Physical layer, Data Link layer, Network layer, Transport layer, Session layer, and Presentation layer). Implementation of these layers may include routing Ethernet frames, routing Internet Protocol (IP) packets, session management, encrypting and decrypting packets, retransmitting lost packets, etc.

Although FIG. 3 shows exemplary functional components of device 130, in other implementations, device 130 may include fewer functional components, different functional components, differently arranged functional components, or additional functional components than depicted in FIG. 3. Additionally, any one of the components (or any group of components) of device 130 may perform functions described as performed by one or more other functional components of device 130.

Figure 4A:
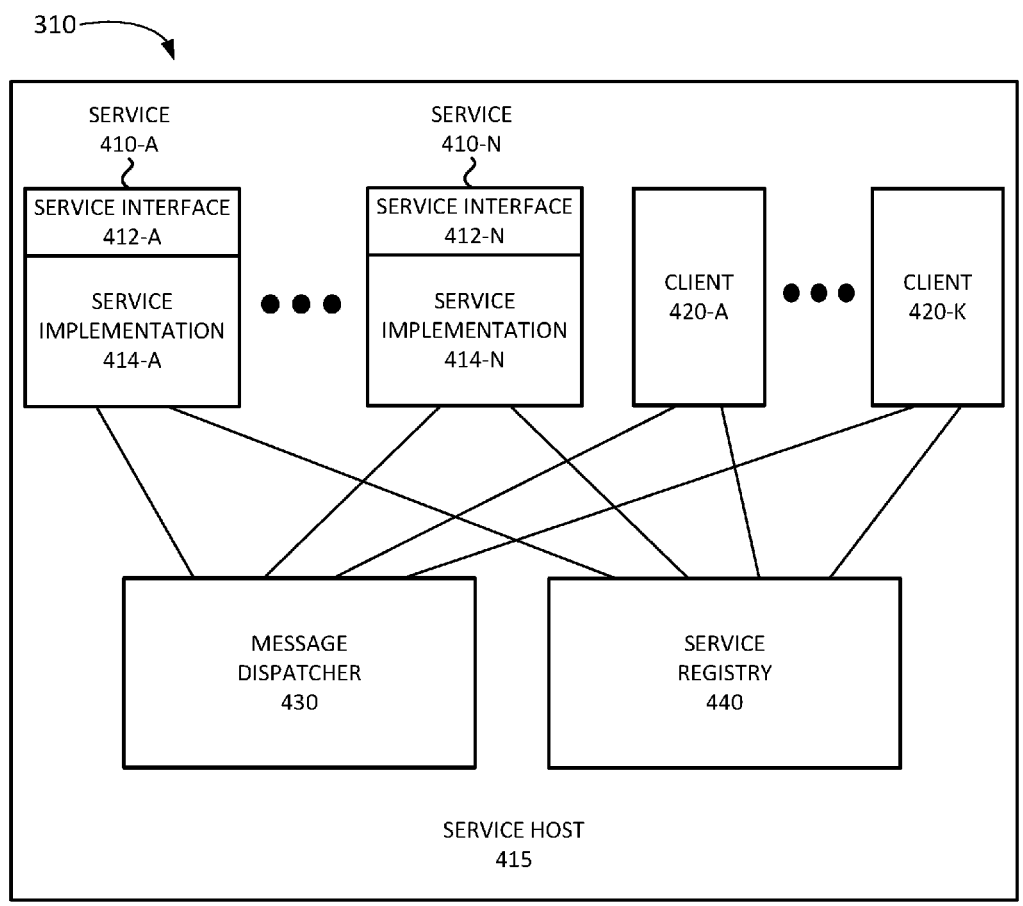
FIG. 4A is a block diagram illustrating exemplary functional components of a service layer of FIG. 3.

FIG. 4A is a block diagram illustrating exemplary functional components of service layer 310. As shown in FIG. 4A, service layer 310 includes a service host 415. Service host 415 may include one or more services 410-A to 410-N (referred to collectively as "services 410" and individually as "service 410"), one or more clients 420-A to 420-K (referred to collectively as "clients 420" and individually as "client 420"), a message dispatcher 430, and a service registry 440.

Service 410 corresponds to a service instance associated with service host 415 of service layer 310 of device 130. In one embodiment, service 410 includes a service interface 412 and a service implementation 414. Service interface 412 may include a communication protocol, such as a standardized communication protocol. In one implementation, the communication protocol includes a unique name and version. Service interface 412 may be specified using a Simple Object Access Protocol (SOAP) interface specification, a JavaScript Object Notation (JSON) interface specification, and/or another type of interface specification. Service implementation 414 includes the implementation of service 410. Service implementation 414 processes requests received via service interface 412 and/or responds to service requests through service interface 412. Service interface 412 may convert responses received from service implementation 414 into a particular format compatible with the proper protocol, which client 420 uses to exchange messages with service 410.

In one embodiment, client 420 requests a service instance of a particular service type by sending a request to service registry 440. Once a service instance is identified and selected, client 420 may send a request to the identified and selected particular service instance via message dispatcher 430. As discussed above, clients 420 may also be services 410. The term "client" or "client service" identifies the service as one that is requesting another service.

Message dispatcher 430 receives incoming messages from client 420 and directs them to service 410 that is the intended recipient of the incoming message. Furthermore, message dispatcher 430 may receive messages from a service and send the message to a particular client 420. If the destination of the incoming message is not on the same device 130 as message dispatcher 430, then the message may be forwarded to the overlay network layer 320 for forwarding to the correct device 130. Services 410 and clients 420 may function as endpoints in the overlay network implemented by overlay network layer 320. Thus, in one embodiment, overlay network layer 320 may maintain a routing table based on the routing tree of the overlay network. The routing table may include a list of next hop destinations for particular node IDs. Message dispatcher 430 may identify a next hop destination for the outgoing ID and may provide the message to overlay network layer 320 for delivery. Thus, in this embodiment, message dispatcher 430 implements a request-response messaging mechanism.

Service registry 440 maintains a list of deployed services 410 along with properties associated with the deployed services (e.g., instances of services). Exemplary components of service registry 440 are described in more detail below with reference to FIG. 4C. A service 410 may register with a service registry 440 by providing service registry 440 with a description of the service (e.g., including properties of the service). Because clients 420 may also be services 410, clients 420 may also register with service registry 440.

Figure 4B:
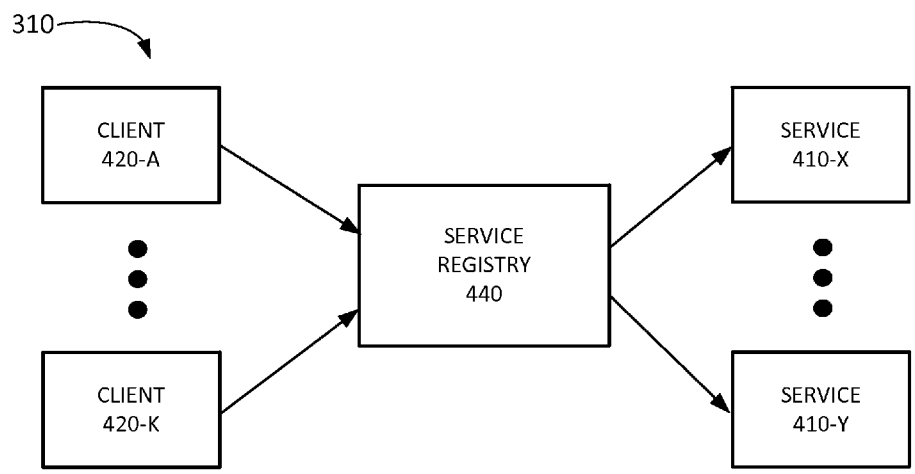
FIG. 4B is a block diagram illustrating the functionality of the service registry of FIG. 4A.

FIG. 4B is a block diagram illustrating the functionality of service registry 440. As shown in FIG. 4B, service registry 440 may receive search queries from clients 420. A search query may specify a particular service type, one or more requested properties for the particular service type, a requested number of hits, and/or one or more other parameters. Service registry 440 may identify services 410 that satisfy the search query. If the number of requested hits is not satisfied by service registry 440, service registry 440 may forward a query to another service registry 440 (e.g., an adjacent service registry 440) in the overlay network. In one embodiment, service registry 440 does not select a particular service instance based on a search query. Rather, in this embodiment, service registry 440 returns the results of the query to client 420 and client 420, which originated the query, may select a particular service instance from the search results. In another embodiment, service registry 440 selects the particular service instance based on the search query from the results of the query.

Although FIGS. 4A and 4B show exemplary functional components of service layer 310, in other implementations, service layer 310 may include fewer functional components, different functional components, differently arranged functional components, or additional functional components than depicted in FIGS. 4A and 4B. Additionally, any one of the components (or any group of components) of service layer 310 may perform functions described as performed by one or more other functional components of service layer 310.

Figure 4C:
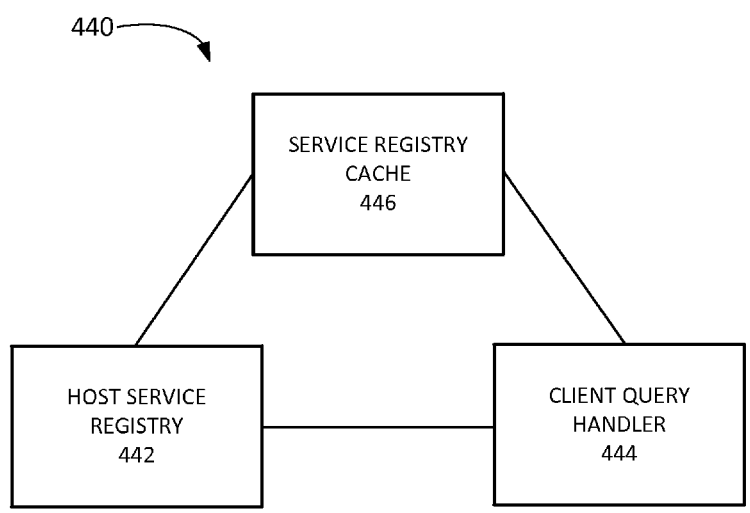
FIG. 4C is a block diagram illustrating exemplary functional components of the service registry of FIG. 4A.

FIG. 4C is a block diagram illustrating exemplary functional components of service registry 440. As shown in FIG. 4C, service registry 440 may include a host service registry database (DB) 442, a query handler 444, and a service registry cache 446.

Host service registry DB 442 may maintain a list of services 410 hosted by service host 415 and/or properties of those services. An example of a service listed in host service registry DB 442 and properties of the service is provided below with respect to FIG. 4D. Host service registry DB 442 may be populated by services 410 registering with service registry 440. Host service registry DB 442 may also expose an interface for adding or removing listed services and reading or writing properties of the services hosted by service host 415 and/or write service properties. In one embodiment, for example, host service registry DB 442 may maintain a list of services 410 hosted by a service host 415 on a different device 130. The service host 415 on the different device may list its services in a service registry on another device using the exposed interface. Furthermore, host service registry DB 442 may expose a search query service interface accessible by other service registries. Thus, other service registries may use the search query service interface to determine whether host service registry DB 442 includes an entry that satisfies a particular query. In one embodiment, services listed in host service registry DB 442 may expire (e.g., be removed from DB 442 after a period of time if not refreshed) to help prevent DB 442 from storing outdated information.

Host service registry 442 may receive a subscription request from a service manager, may store the subscription request, and may forward the subscription request to all adjacent service registries. Host service registry 442 may determine whether a service matches the subscription request and may send a subscription notification back to a service manager that originated the subscription request if a matching service is identified. Furthermore, host service registry 442 may determine whether an update to a stored service is associated with a subscription. If an update is associated with a subscription, host service registry 442 may send a subscription notification to the service manager (or another type of service) that originated the subscription request for the associated subscription.

Query handler 444 may handle queries received from client 420. In one embodiment, given a query, query handler 444 first searches the local host service registry DB 442, followed by service registry cache 446. Query handler 444 may issue a call to other service registries if the query has not been satisfied, for example. Service registry cache 446 may store data from remote service registries 440. Each service host 415 may maintain a local service registry 440 and services 410 that register with service host 415 are registered in the local service registry 440. A query from client 420 that cannot be satisfied by the local service registry 440 may be sent to one or more neighboring service hosts 415 to see if the neighboring service hosts 415 have service registries 440 that include services that satisfy the query. The remote service registry 440 may return results of the query back to the local service registry 440 and the results may be stored in service registry cache 446. In some implementations, parent nodes may cache data for their children nodes, while children nodes may not cache data for their parent nodes. In one embodiment, services listed in service registry cache 446 may expire (e.g., be removed from cache 446 after a period of time if not refreshed) to help prevent cache 446 from storing outdated information.

Although FIG. 4C shows exemplary functional components of service registry 440, in other implementations, service registry 440 may include fewer functional components, different functional components, differently arranged functional components, or additional functional components than depicted in FIG. 4C. Additionally, any one of the components (or any group of components) of service registry 440 may perform functions described as performed by one or more other functional components of service registry 440.

Figure 4D:
FIG. 4D is a block diagram of an exemplary property table for a particular service that may be stored by the service registry of FIG. 4A.

FIG. 4D is a block diagram of an exemplary property table 460 for a particular service that may be stored by service registry 440. In one embodiment, an instance of a service (e.g., each instance) is associated with a property table, such as table 460. Host service registry database DB 442 may store a property table for each service registered with the corresponding service registry 440. In one embodiment, as described above, the information stored in any one service registry DB 442 may be different than information stored in other service registry databases. Exemplary property table 460 includes eight fields: ID field 462, interface field 464, service format field 468, transport protocol field 470, CPU ranking 472, disk space field 474, and RAM field 476.

Instance ID field 462 uniquely defines the instance of the particular service. The instance ID (possibly along with the node ID) may uniquely identify the service instance from any other services (of the same type or different type) in the network. In one embodiment, instance ID field 462 is an integer. In table 460, the instance ID is 6529 as an example.

Interface field 464 identifies the name of the interface of the service. In this case, the interface field 464 may also identify the type of service by the type of interface. For example, table 460 identifies the interface as "STORAGE SERVICE". Service format field 468 identifies the format used by the instance of the service. As an example, table 460 identifies the service format as "JSON". Transport protocol field 470 identifies the protocol used by the instance of the service. As an example, table 460 identifies the service format as "NODE PROTOCOL".

CPU ranking field 472 identifies the performance of the CPU associated with the service instance. In one embodiment, a scale is used (e.g., 1 to 100). Table 460 identifies the CPU ranking as 20/100 for the service in CPU ranking field 742. RAM field 476 identifies the amount of random-access memory available to the service. Table 460 identifies the available RAM as 2 GB in field 476.

Although FIG. 4D shows exemplary components of property table 460, in other implementations, property table 460 may include fewer components, different components, differently arranged components, or additional components than depicted in FIG. 4D.

Figure 5A:
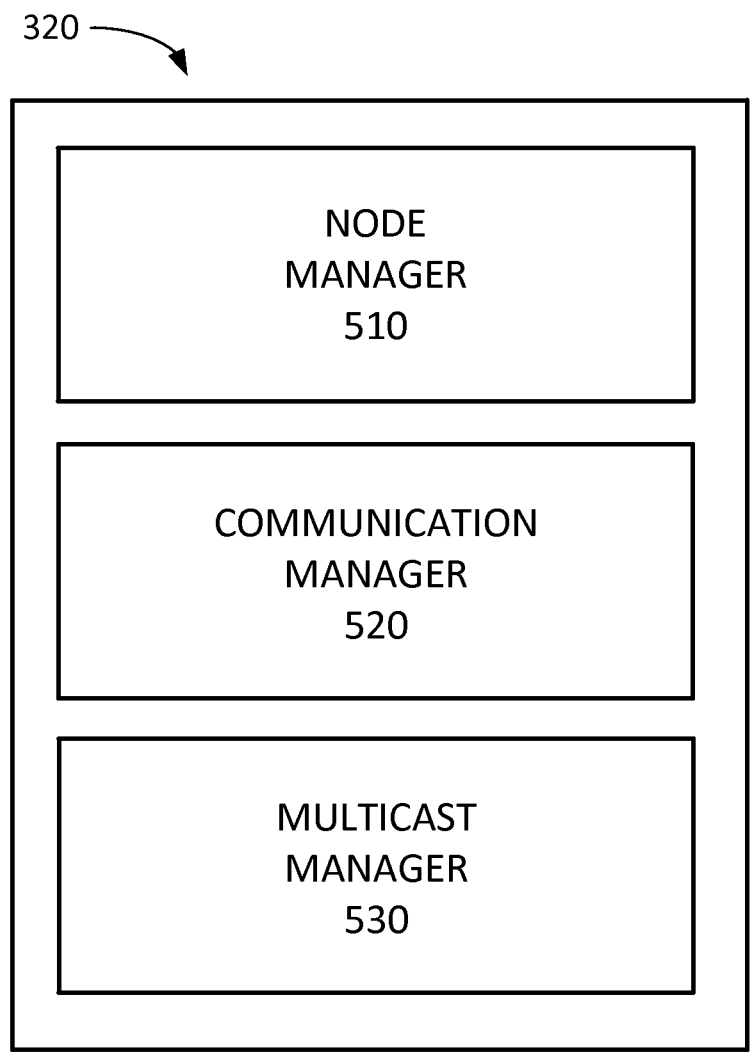
FIG. 5A is a block diagram illustrating functional components of an overlay network layer of FIG. 3.

FIG. 5A is a block diagram illustrating functional components of overlay network layer 320. As shown in FIG. 5A, overlay network layer 320 may include a node manager 510, a communication manager 520, and a multicast manager 530.

Node manager 510 may provide node information, such as a node ID, to other nodes in the overlay network. Furthermore, node manager 510 may maintain a list of nodes in the overlay network. Node manager 510 may perform node discovery to identify new nodes added to the overlay network and/or to rediscover lost nodes that have re-joined the overlay network. Node manager 510 may also determine the topology of the network, as described below (e.g., which nodes are nearest other nodes).

Communication manager 520 may enable nodes to communicate with each other. Communication manager 520 may implement a mechanism to traverse the tree of the overlay network. Tree traversal may be performed in connection with search queries of service registries or when a direct communication method to another node is not available. Furthermore, communication manager 520 may implement a direct communication method that may enable particular nodes of the overlay network to communicate directly without having to traverse the tree of the overlay network.

Multicast manager 530 may implement a multicast mechanism. The multicast mechanism may be used to send a message to the members of a multicast group (e.g., all the members). Furthermore, the multicast mechanism may be used to implement a subscribe-notify messaging pattern. Thus, an event associated with a particular service instance may be used to trigger a message sent to the nodes that have subscribed to messages from the particular service instance. Multicast manager 530 may include an application layer multicast manager or a multicast manager from lower OSI layers.

Although FIG. 5A shows exemplary functional components of overlay network layer 320, in other implementations, overlay network layer 320 may include fewer functional components, different functional components, differently arranged functional components, or additional functional components than depicted in FIG. 5A. Additionally, any one of the components (or any group of components) of overlay network layer 320 may perform functions described as performed by one or more other functional components of overlay network layer 320.

Figure 5B:
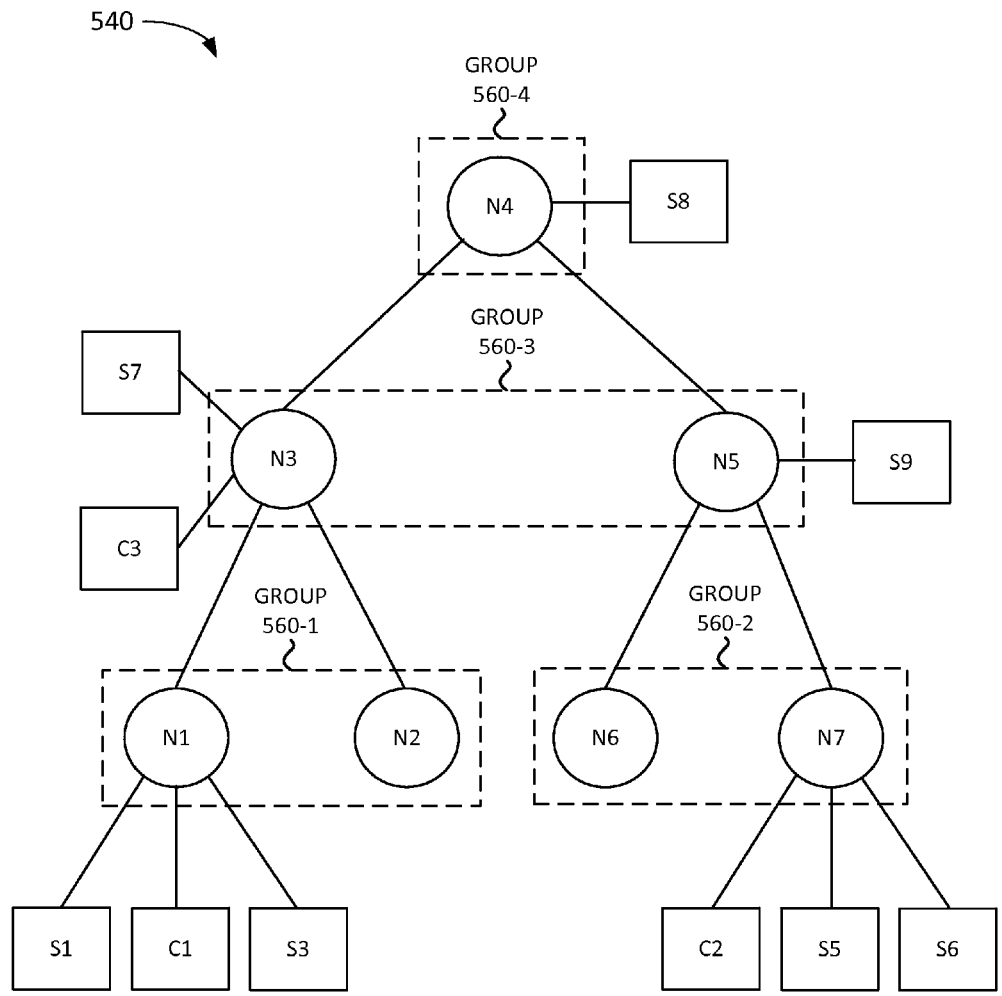
FIG. 5B is a block diagram of a tree of an exemplary functional overlay network.

FIG. 5B is a block diagram of an exemplary topology of an overlay network 540. As shown in the example of FIG. 5B, overlay network 540 includes nodes N1 to N7. Nodes N1 and N2 are in multicast group 560-1. Node N1 includes service endpoints S1 and S3 and client endpoint C1. Node N3 is the parent node to nodes N1 and N2. Node N3 includes a service endpoint S7 and a client endpoint C3.

Nodes N6 and N7 are in multicast group 560-2 and node N7 includes client endpoint C2 and service endpoints S5 and S6. Node N5 is the parent node to nodes N6 and N7 and includes service endpoint S9. Nodes N3 and N5 are in multicast group 560-3. Node N4 is the parent node to nodes N3 and N5 and is the root node of overlay network 540. Furthermore, node N4 is in multicast group 560-4 and includes service endpoint S8. Although parent nodes in the topology of network 540 have two child nodes, in other implementations, parent nodes may have more than two child nodes.

Assuming each service endpoint is associated with a service registry 440, a search query may traverse overlay functional network 540 as follows. Assume service endpoint S7 in node N3 executes a search query to identify a particular service included in service endpoint S1 and service endpoint S5 (i.e. for which S1 and S5 are a match). Service endpoint S7 may send the search query to its local service registry, which may result in no matches in the search query. The local service registry may then identify adjacent service registries in the overlay network, which may include a service registry in node N1 and a service registry in node N4 (node N2 may not include a service registry, since there are no service endpoints associated with node N2). The service registry in node N1 may return a hit identifying service endpoint S1. The service registry in node N4 may return no hits and may forward the search query to its adjacent service registries, which in this case include service registries in nodes N3 and N5. However, since the service registry in node N3 has already processed the search, the search query may only be sent to the service registry in node N5. The service registry at node N5 may come up with no hits and may forward the search query to a service registry at node N7. Node N7 may identify service endpoint S5 as a hit and may return the results of the search query to node N4 and node N4 may forward the search results to service endpoint S7 in node N3.

Service endpoint S7 may then select communicate with either service endpoint S1 at node N1 or service endpoint S5 at node N7. In some implementations, service endpoint S7 may send a message to service endpoint S5 via nodes N4 and N5. In other implementations, service endpoint S7 may send a message to service endpoint S5 by communicating directly with node N7.

As another example, service endpoint S7 may only require the first match to the search query. Nodes may forward search queries to other nodes in a priority order that prioritizes nodes that are further down the tree. Thus, node N3 would forward the search query to nodes N1 and N2, before sending the search query to node N4, since nodes N1 and N2 are further down the tree (i.e., are children of node N3), while node N4 is further up the tree (i.e., is a parent of node N3). Since node N1 identifies a match for the search query, and service endpoint S7 only requires one match, the search may terminate before the search query is sent to node N4.

Figure 6:
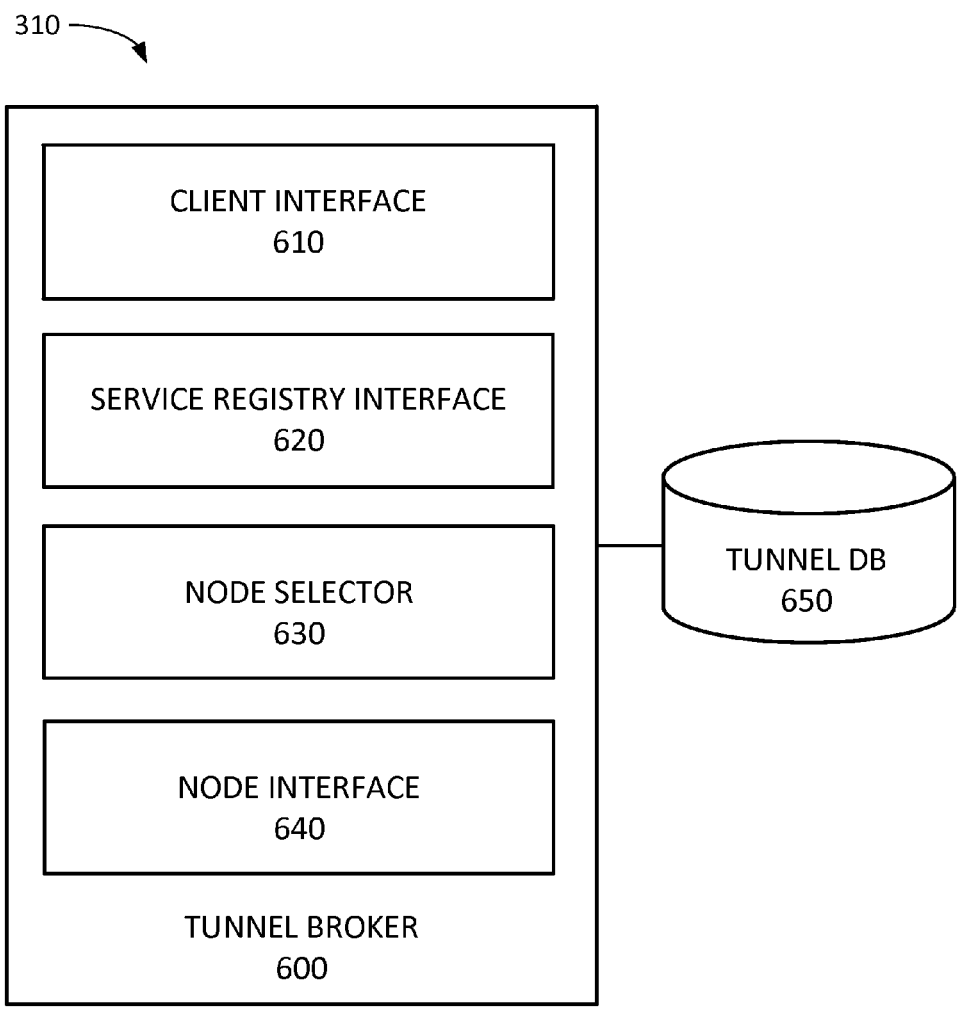
FIG. 6 is a block diagram illustrating functional components of a tunnel broker.

FIG. 6 is a block diagram illustrating functional components of a tunnel broker 600. Tunnel broker 600 may be configured to establish and manage a communication tunnel based on a requested service property. As shown in FIG. 6, tunnel broker 600 may include a client interface 610, a service registry interface 620, a node selector 630, a node interface 640, and may communicate with a tunnel DB 650.

Client interface 610 may communicate with client 420. Client interface 610 may receive a request from client 420 for a communication tunnel to a service having a requested service property and may send an acknowledgement to client 420 that the request has been received. Furthermore, client interface 610 may configure client 420 for a first end of a communication tunnel. For example, client interface 610 may configure a node (e.g., device 130) hosting client 420 to receive and/or send packets, or other types of data units, encapsulated with tunnel headers associated with a communication tunnel.

Service registry interface 620 may communicate with service registry 440. For example, service registry interface 620 may generate a search query based on a request received by client interface 610 and may send the search query to service registry 440. Furthermore, service registry interface 620 may send a subscription request to service registry 440 to receive updates relating to the search query. Service registry interface 620 may receive search results from service registry 440 and may provide the search results to node selector 630.

Node selector 630 may select a particular node, and a particular service instance hosted by the node, as a second end of a communication tunnel. Node selector 630 may select the particular node and/or service instance based on search results obtained by service registry interface 620. For example, node selector 630 may rank the search results and may select a node and/or service instance that best matches the requested service property or properties. Additionally or alternatively, node selector 630 may select a node based on additional criteria. For example, node selector 630 may determine one or more connection metrics for the nodes in the received search results. A connection metric may correspond to a measure of the quality of connection between client 420 and each particular node in the received search results. A connection metric may include a total available bandwidth; a percentage bandwidth capacity; a highest, lowest, or average bitrate; a highest available Quality of Service (QoS); whether or not the client and the particular node are in the same domain; whether network address translation (NAT) is required between the client and the particular node; whether a firewall exists between the client and the particular node; and/or based one other types of connection metrics.

Node interface 640 may communicate with particular nodes in the system. For example, node interface 640 may configure a node (e.g., device 130) for a second end of a communication tunnel. For example, node interface 640 may configure the node to receive and/or send packets, or other types of data units, encapsulated with tunnel headers associated with the communication tunnel.

Tunnel DB 650 may store information relating to communication tunnels managed by tunnel broker 600. Exemplary information that may be stored in tunnel DB 650 is described below with reference to FIG. 7B.

Although FIG. 6 shows exemplary functional components of tunnel broker 600, in other implementations, tunnel broker 600 may include fewer functional components, different functional components, differently arranged functional components, or additional functional components than depicted in FIG. 6. Additionally, any one of the components (or any group of components) of tunnel broker 600 may perform functions described as performed by one or more other functional components of tunnel broker 600.

Figure 7A:
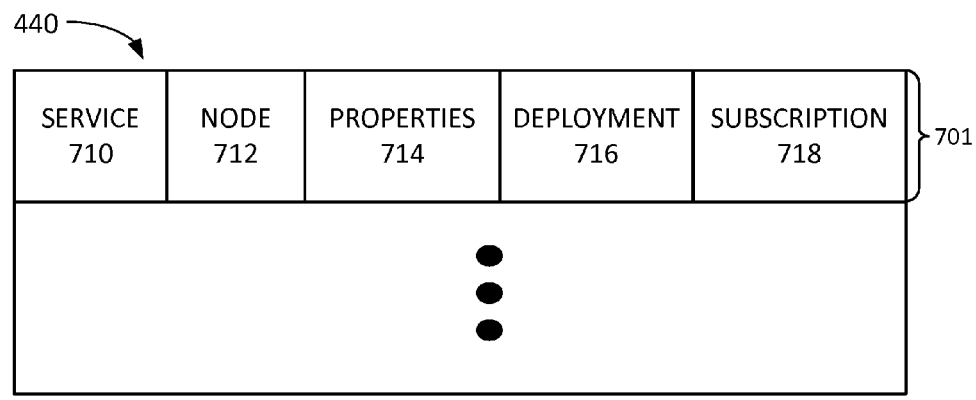
FIG. 7A is a block diagram illustrating components that may be stored in the service registry of FIG. 4A.

FIG. 7A is a block diagram illustrating components that may be stored in service registry 440. As shown in FIG. 7A, service registry 440 may include one or more service entries 701. Each service entry 401 may store information relating to a particular service hosted by service host associated with service registry 440. Service entry 401 may include a service field 710, node field 712, properties field 714, deployment field 716, and subscription field 718.

Service field 710 may identify a particular service associated with the service entry. For example, service field 710 may identify a service interface associated with the particular service. Node Field 712 may identify a particular node (e.g., device 130) associated with the particular service. In some implementations, a first node may maintain a service registry for a second node and may identify services associated with the second node in the service registry. Properties field 714 may store information identifying properties associated with the particular service. For example, properties field 714 may include information identifying a location associated with the service, an operating system associated with the service, a processing load associated with the service, a bandwidth capacity associated with the service, a memory capacity associated with the service, a storage capacity associated with the service, a sub-network and/or network domain associated with the service, a security level associated with the service, a codec type associated with the service, and/or another type of property.

Deployment field 716 may include information identifying whether the service is deployed or whether the service is available for deployment. Subscription field 718 may include information identifying subscriptions associated with the service. A service may be associated with one or more subscriptions. The subscription information may, for example, identify a particular tunnel broker 600 (e.g., based on a node ID) that has subscribed to notifications about changes to the service. Thus, if the service is deployed, made unavailable, if a property of the service changes, and/or if another type of change is detected, a notification may be sent to tunnel broker 600.

Although FIG. 7A shows exemplary components of service registry 440, in other implementations, service registry 440 may include fewer components, different components, differently arranged components, or additional components than depicted in FIG. 7A.

Figure 7B:
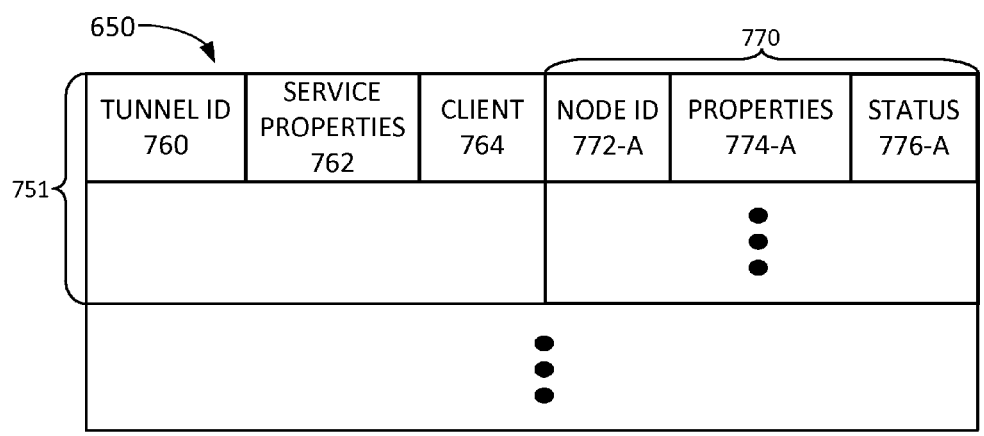
FIG. 7B is a block diagram illustrating components that may be stored in the tunnel database of FIG. 6.

FIG. 7B is a block diagram illustrating components that may be stored in the tunnel DB 660. Tunnel DB 650 may store one or more tunnel records 751. Each tunnel record 751 may store information relating to a particular communication tunnel managed tunnel broker 600. Tunnel record 751 may include a tunnel ID field 760, a service properties field 762, a client field 764, and one or more node fields 770.

Tunnel ID field 760 may store an identifier that uniquely identifies a particular communication tunnel. Furthermore, tunnel ID field 760 may store tunnel header information (e.g., routing labels) associated with the particular communication tunnel. Service properties field 762 may store information identifying one or more requested service properties, such as a particular service interface, a particular operating system, a particular processing capacity, a particular storage capacity, a particular bandwidth and/or bitrate, a particular location, a particular codec, a particular network domain, a particular security level, and/or another type of service property.

Client field 764 may store information relating to client 420 that made the request for the communication tunnel. For example, client ID field 764 may store a node ID associated with client 420 in the overlay network. Furthermore, client ID field 764 may store a network address associated with client 420 in the underlying network (e.g., network 110, sub-network 120, etc.).

Each node field 760 may store information relating to a particular node in the system that has been identified as hosting a service that matches the requirements specified in the service properties field 762 of tunnel record 751. Node field 760 may include a node ID field 772, a properties field 774, and a status field 776.

Node ID field 772 may store information identifying the particular node. For example, node ID field 764 may store a node ID associated with the particular node in the overlay network. Furthermore, node ID field 764 may store a network address associated with the particular node in the underlying network (e.g., network 110, sub-network 120, etc.).

Properties field 774 may store information relating to the properties of a service instance, hosted by the particular node, which matches the request associated with the communication tunnel. For example, properties field 774 may include information identifying the service instance, information identifying the service interface of the service instance, and/or one or more properties associated with the service instance. Information in properties field 774 may be updated at particular intervals. For example, tunnel broker 600 may receive updates from service registry 440 at particular intervals based on a subscription request submitted by tunnel broker 600 to service registry 440.

Status field 776 may include status information associated with the particular node. For example, the status information may include a search result rank for the particular node, whether or not a second end of a communication tunnel is established for the particular node, one or more connection metrics associated with a connection from the client to the particular node, and/or other types of status information associated with the particular node.

Although FIG. 7B shows exemplary components of capabilities DB 640, in other implementations, capabilities DB 640 may include fewer components, different components, differently arranged components, or additional components than depicted in FIG. 7B.

Figure 8:
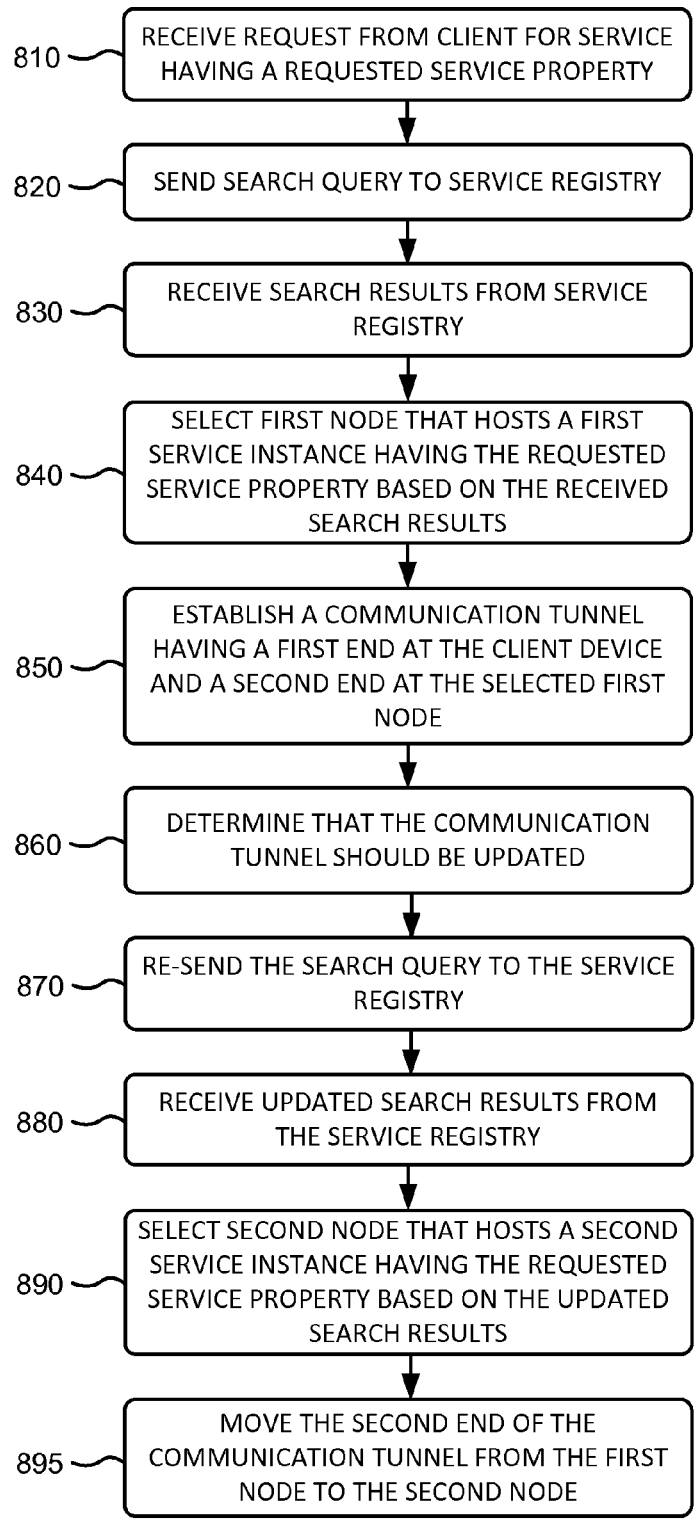
FIG. 8 is a flowchart of a process for setting up and managing a communication tunnel according to an implementation described herein.

FIG. 8 is a flowchart of a process for setting up and managing a communication tunnel according to an implementation described herein. In one implementation, the process of FIG. 8 may be performed by tunnel broker 600 in device 130. In other implementations, some or all of the process of FIG. 8 may be performed by another device or a group of devices separate from and/or including tunnel broker 600.

The process of FIG. 8 may include receiving a request from a client for a service having a requested service property (block 810). For example, a device 130 may include a service acting as a client that requests a service having a particular service property. Client 420 may first contact service registry 440 to request the location of the nearest tunnel broker. Service registry 440 may return a node ID identifying tunnel broker 600 to client 420. Client 420 may subsequently send a request to tunnel broker 600 to establish a communication tunnel to a service with a requested service property. The requested service property may include one or more of a particular service interface, a particular operating system, a particular processing capacity, a particular storage capacity, a particular bandwidth and/or bitrate, a particular location, a particular codec, a particular network domain, a particular security level, and/or another type of service property.

A search query may be sent to a service registry (block 820) and search results may be received from the service registry (block 830). For example, tunnel broker 600 may receive the request from client 420, may generate a search query based on the requested service properties, and may send the generated search query to the nearest service registry 440. Service registry 440 may evaluate the search query and may return search results that includes a list of one or more nodes in the system that match the requested service property or properties. If service registry 440 returns an empty list, indicating that a service with the requested property is not available in the system, tunnel broker 600 may generate an alert and may send the alert to client 420 and/or to administration device 150.

In some implementations, service registry 440 may return a list of nodes and/or service instances that most closely matches the requirements, even though none of the nodes and/or service instances satisfy all the requirements. In such situations, tunnel broker 600 may select the node and/or service instance that best matches the requirements associated with the requested service property or properties.

In some implementations, the client may request a one-to-many communication tunnel. For example, the client may request a communication tunnel to a particular number of service instances having a requested property. As an example, a video monitoring service client may request a communication tunnel to five different video streams from cameras at a particular location. In such implementations, tunnel broker 600 may request a particular number of search results for the search query.

A first node that hosts a first service instance having the requested service property may be selected based on the received search results (block 840). For example, tunnel broker 600 may select a node, and/or service instance hosted by the node, which best matches the requested service property. In some implementations, tunnel broker 600 may select the first node based on additional criteria. For example, tunnel broker 600 may select the first node based on one or more connection metrics associated with a connection between each particular node in the search results and the client device. Examples of connection metrics include a total available bandwidth for the connection; a percentage bandwidth capacity for the connection; a highest, lowest, or average bitrate for the connection; a highest available Quality of Service (QoS) for the connection; whether or not the client and the particular node are in the same domain; whether network address translation (NAT) is required between the client and the particular node; whether a firewall exists between the client and the particular node; and/or based one other types of connection metrics.

In situations in which the client requests a one-to-many communication tunnel, tunnel broker 600 may select multiple nodes for multiple second end of the communication tunnel and may individually set up the second ends of the communication tunnel for each selected node.

A communication tunnel may be established having a first end at the client device and a second end at the selected first node (block 850). For example, tunnel broker 600 may use TSP, or another protocol, to set up a communication tunnel between client 420 and the selected first node. For example, tunnel broker 600 may generate one or more tunnel headers and/or labels, may configure device 130 hosting client 420 to encapsulate packets, or other types of data units, with the generated tunnel headers and/or labels, and may configure the selected first node to encapsulate packets, or other types of data units, with the generated tunnel headers and/or labels. The communication tunnel may include a Multi-Protocol Label Switching (MPLS) tunnel, a Generic Routing Encapsulation (GRE) tunnel, an Internet Protocol (IP) Security (IPSec) tunnel, a Virtual Local Area Network (VLAN) tunnel, a Virtual Private Network (VPN) tunnel, and/or another type of communication tunnel.

A determination may be made that the communication tunnel should be updated (block 860). As an example, tunnel broker 600 may re-send the search query to service registry 440 at particular intervals and may receive updated search results from service registry 440. The updated search results may indicate that the first node is not available, that the first node no longer hosts the service (e.g., that the service instance is no longer deployed), that the properties of the hosted service no longer match the requirements of the requested service property, and/or that another system node hosts a service instance that better matches the requirements of the requested service property.

As another example, tunnel broker 600 may receive an update from service registry 440 without re-sending the search query. For example, tunnel broker 600 may set up a subscription for changes to service matching the search query and service registry 440 may send periodic updates to tunnel broker 600. As yet another example, tunnel broker 600 may receive a message from client 420 that the first node is not reachable via the established communication tunnel or may receive a message from the first node that the first node is no longer hosting the requested service.

The search query may be re-sent to the service registry (block 870) and updated search results may be received from the service registry (block 880). In situations in which the determination to update the communication tunnel was not made based on an update received from service registry 440, tunnel broker 600 may re-send the search query to service registry 440 and may receive updated search results from service registry 440.

A second node that hosts a second service instance having the requested service property may be selected based on the updated search results (block 890). For example, tunnel broker 600 may select a second node, and/or service instance hosted by the second node, which best matches the requested service property based on the updates search results, and/or based on additional criteria, such as determined connection metrics for the nodes includes in the updated search results.

The second end of the communication tunnel may be moved from the first node to the second node (block 895). For example, tunnel broker 600 may use TSP, or another protocol, to end the communication tunnel between client 420 and the first node and to set up a communication tunnel between client 420 and the selected second node. For example, tunnel broker 600 may configure the first node to stop encapsulating packets, or other types of data units, with the generated tunnel headers and/or labels associated with the communication tunnel and may configure the selected second node to encapsulate packets, or other types of data units, with the generated tunnel headers and/or labels. Blocks 870, 880, 890, and 895 may be repeated whenever tunnel broker 600 determined that the communication tunnel should be updated.

Figure 9A:
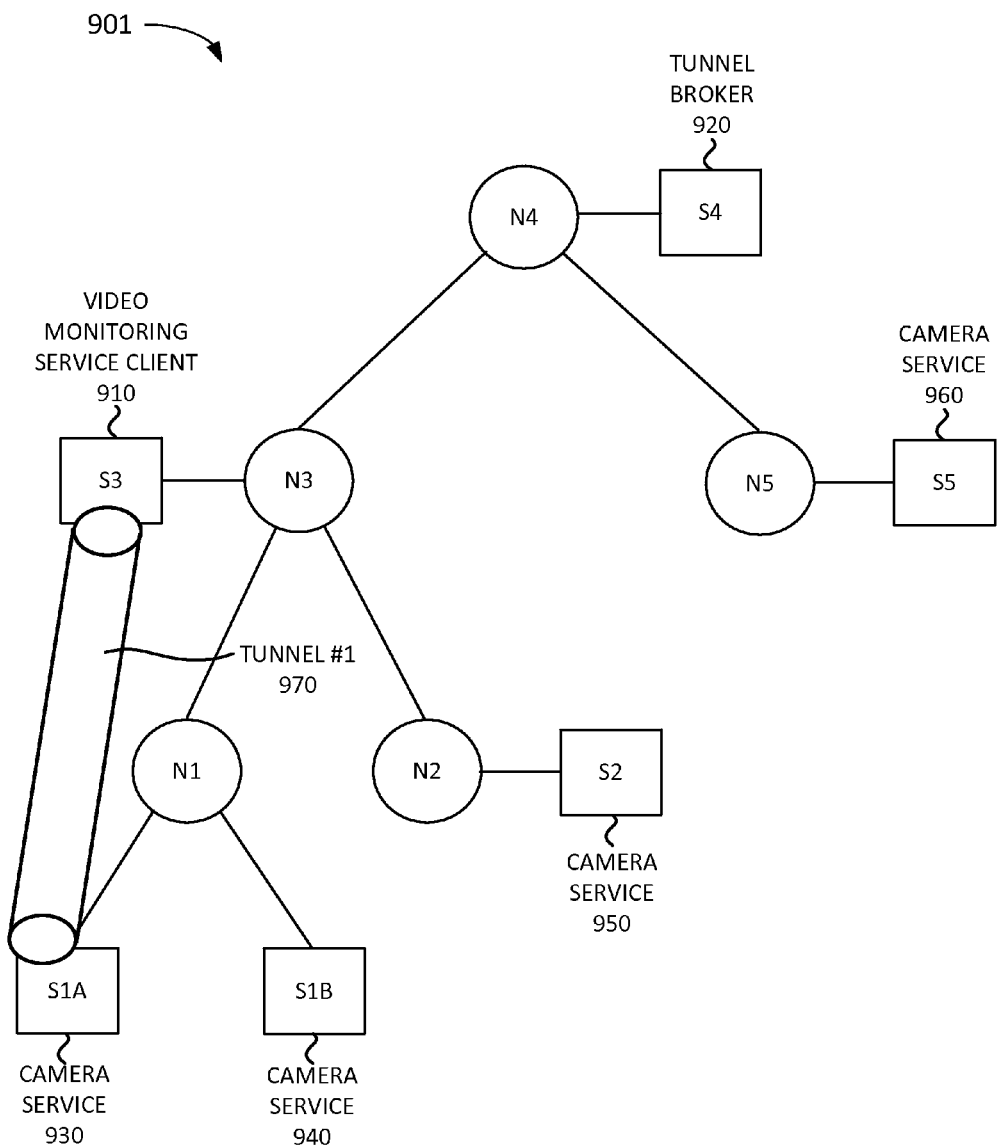
FIGS. 9A-9C are diagrams of exemplary scenarios of setting up and managing a communication tunnel according to an implementation described herein.
Figure 9B:
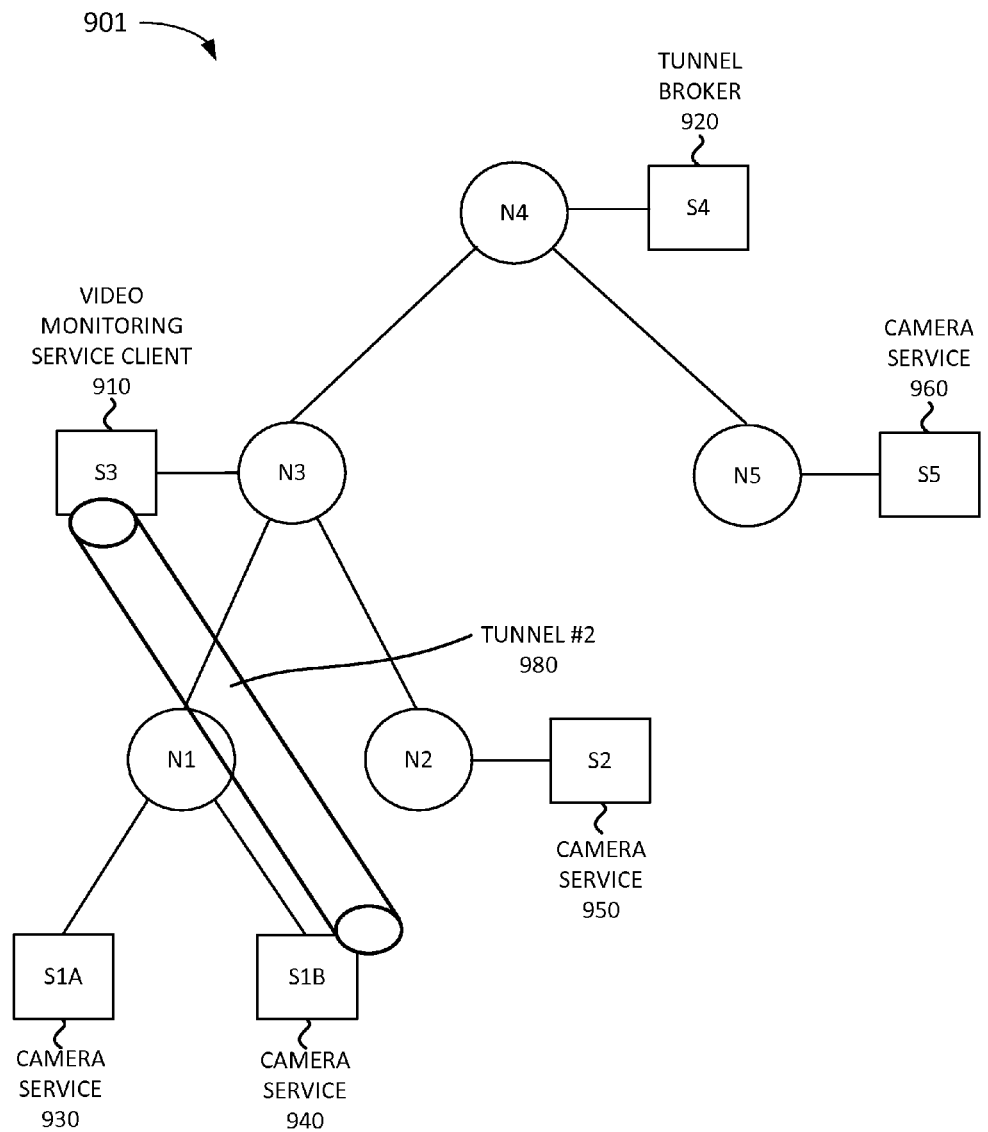
Figure 9C:
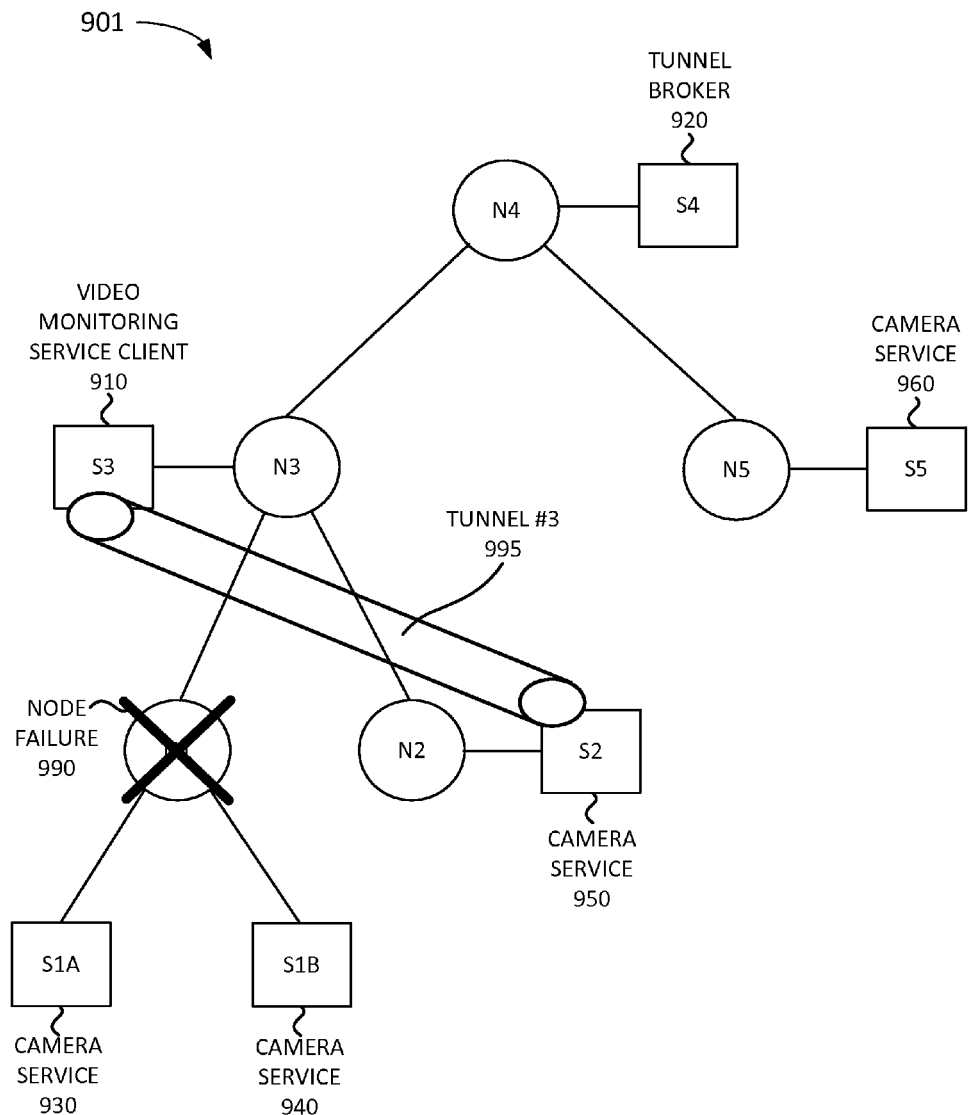

FIGS. 9A-9C are diagrams of exemplary scenarios of setting up and managing a communication tunnel according to an implementation described herein. FIG. 9A illustrates an overlay network 910 that includes nodes N1, N2, N3, N4, and N5. Node N3 includes a service S3 corresponding to a video monitoring service client 910. Node N4 includes a service S4 corresponding to a tunnel broker service 920. Node N1 includes a service instance S1A, corresponding to a camera service 930 and a service instance S1B, corresponding to a camera service 940. Node N2 includes a service instance S2, corresponding to a camera service 950 and Node N5 includes a service instance S5, corresponding to a camera service 960.

Video monitoring service client 910 may require a camera service providing a video stream from a particular location, at a particular resolution, and at a particular bitrate. Thus, video monitoring service client 910 may send a request for a communication tunnel to tunnel broker 920 at node N4 and may specify the required service properties in the request. Tunnel broker 920 may generate a search query based on the request and may submit the search query to a service registry at node N4. The service registry at node N4 may forward the search query to service registries at the other nodes and other nodes may continue to forward the search query until a required number of search results are obtained or until all service registries have processed the search query.

Assume camera services 930, 940 and 950 satisfy the location and resolution requirements, but none of the available camera services fully satisfy the bitrate requirement. Furthermore, assume tunnel broker 920 determines that the connection from node N3 to node N1 is higher in quality than the connection from node N3 to node N2. Thus, tunnel broker service 920 may select node N1. Furthermore, assume camera service 930 has a higher bitrate than camera service 940 and, therefore, tunnel broker service 920 selects camera service 930. Tunnel broker service 920 may then establish tunnel 970 between video monitoring service client 910 and camera service 930. Video monitoring service client 910 may now receive a streaming video signal from camera service 930 via tunnel 970.

Continuing to FIG. 9B, assume that the bitrate associated with camera service 940 improves as a result of camera service 940 freeing up processing resources. The service registry of node N1 may include a subscription from tunnel broker 920 to receive updated to service properties associated with camera service 930 and camera service 940. Thus, the service registry of node N1 may send a subscription update to tunnel broker 920. Tunnel broker 920 may determine that camera service 940 is now a better match for the communication tunnel and may switch the second end of communication tunnel 970 to camera service 940 to establish communication tunnel 980.

Continuing to FIG. 9C, assume that node N1 experiences a node failure 990. Video monitoring service client 910 may stop receiving the video stream from camera service 940 and may send a message to tunnel broker service 920, indicating that node N1 has become unavailable. In response, tunnel broker service 920 may select the next best available service based on the most recent search results associated with the search query based on the communication tunnel request generated by video monitoring service client 910. Tunnel broker service 920 may select camera service 950 at node N2 and may move the second end of the tunnel from node N1 to camera service 950 at node N2 to generate tunnel 995. Thus, video monitor service client 910 may continue to receive a video stream from the specified location at the best available bitrate and resolution.

This application incorporates by reference the following applications filed the same date as the present application Ser. No. 14/218,579 titled "Capability Monitoring In a Service Oriented Architecture; and Ser. No. 14/217,978, titled "Finding Services In a Service-Oriented Architecture (SOA) Network."

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIG. 8, and an order of signal flows have been described with respect to FIGS. 9A-9C, the order of the blocks and/or signal flows may be modified in other implementations. Further, non-dependent blocks and/or signal flows may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software). The word "exemplary" as used herein means "as an example for illustration."

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a computer device, comprising:

receiving, by the computer device, a request from a client device for a service in a system, the service having a requested service property;

selecting, by the computer device, a first node in the system that hosts a first service instance having the requested service property based on search results received from a service registry;

establishing, by the computer device, a communication tunnel between the client device and the selected first node, wherein the communication tunnel includes a first end at the client device and a second end at the first node, wherein establishing the communication tunnel includes:

generating a tunnel label;

configuring the client device to encapsulate data units with the generated tunnel label; and configuring the selected first node to encapsulate data units with the generated tunnel label;

determining, by the computer device, that the communication tunnel should be updated based on updated search results received from the service registry;

selecting, by the computer device, a second node in the system that hosts a second service instance having the requested service property based on determining that the communication tunnel should be updated and based on the updated search results; and moving, by the computer device, the second end of the communication tunnel from the first node to the second node transparently with respect to the client device, in response to selecting the second node, wherein moving the second end of the communication tunnel from the first node to the second node includes:

configuring the selected first node to stop encapsulating data units with the generated tunnel label; and configuring the selected second node to encapsulate data units with the generated tunnel label.

2. The method of claim 1, further comprising:

sending a search query that specifies the requested service property to the service registry, wherein the service registry includes a list of services available in one or more nodes of the system;

receiving the search results from the service registry, wherein the search results include a list of one or more nodes having the requested service property; and wherein selecting the first node in the system that hosts the first service instance having the requested service property includes selecting the first node from the list of one or more nodes having the requested service property.

3. The method of claim 1, wherein determining that the communication tunnel should be updated includes:

re-sending the search query to the service registry at particular intervals; and receiving the updated search results from the service registry, wherein the updated search results include an indication that the first node no longer hosts the first service instance having the requested service property or that the first service instance no longer has the requested service property.

4. The method of claim 1, wherein determining that the communication tunnel should be updated includes:

receiving an indication from the service registry that the first node no longer hosts the first service instance having the requested service property or that the first service instance no longer has the requested service property.

5. The method of claim 1, wherein determining that the communication tunnel should be updated includes:
determining that another node in the system is a better match for requirements of the requested service property; and
wherein selecting the second node in the system that hosts the second service instance having the requested service property is based on determining that another node in the system is a better match for the requirements of the requested service property.

6. The method of claim 5, wherein determining that another node in the system is a better match for the requirements of the requested service property includes:
re-sending the search query to the service registry at particular intervals; and
receiving the updated search results from the service registry, wherein the updated search results include an indication that another node in the system is a better match for the requirements of the requested service property.

7. The method of claim 5, wherein determining that another node in the system is a better match for the requirements of the requested service property includes:
receiving an indication from the service registry that the second node hosts the second service instance, wherein the second service instance is a better match for the requirements of the requested service property.

8. The method of claim 2, further comprising:
determining one or more network connection metrics for a connection from the client device to particular nodes of the nodes included in the list of one or more nodes having the requested service property; and
wherein selecting the first node from the list of one or more nodes having the requested service property is further based on the determined one or more network connection metrics.

9. The method of claim 1, wherein the requested service property includes one or more of:
a particular service interface;
a particular operating system associated with the service;
a particular processing capacity associated with the service;
a particular storage capacity associated with the service;
a particular bandwidth associated with the service;
a particular location associated with the service;
a particular codec associated with the service;
a particular domain associated with the service; or
a particular security level associated with the service.

10. A computer device comprising:
a receiver to receive requests for services;
a memory to store information relating to a communication tunnel between a client device and a first node of a plurality of nodes in a system;
a processor configured to:
receive a request from the client device for a service in the system, the service having a requested service property;
select the first node, of the plurality of nodes, in the system that hosts a first service instance having the requested service property based on search results received from a service registry;
establish the communication tunnel between the client device and the selected first node, wherein the communication tunnel includes a first end at the client device and a second end at the first node, wherein, when establishing the communication tunnel, the processor is further configured to:
generate a tunnel label;
configure the client device to encapsulate data units with the generated tunnel label; and
configure the selected first node to encapsulate data units with the generated tunnel label;
determine that the communication tunnel should be updated based on updated search results received from the service registry;
select a second node, of the plurality of nodes, in the system that hosts a second service instance having the requested service property based on determining that the communication tunnel should be updated and based on the updated search results; and
move the second end of the communication tunnel from the first node to the second node transparently with respect to the client device, wherein, when moving the second end of the communication tunnel from the first node to the second node, the processor is further configured to:
configure the selected first node stop encapsulating data units with the generated tunnel label; and
configure the selected second node to encapsulate data units with the generated tunnel label.

11. The computer device of claim 10, wherein the processor is further configured to:
send a search query that specifies the requested service property to the service registry, wherein the service registry includes a list of services available in one or more nodes of the system;
receive the search results from the service registry, wherein the search results include a list of one or more nodes having the requested service property; and
wherein, when selecting the first node in the system that hosts the first service instance having the requested service property, the processor is further configured to:
select the first node from the list of one or more nodes having the requested service property.

12. The computer device of claim 10, wherein when determining that the communication tunnel should be updated, the processor is further configured to:
re-send the search query to the service registry at particular intervals; and
receive the updated search results from the service registry, wherein the updated search results include an indication that the first node no longer hosts the first service instance having the requested service property or that the first service instance no longer has the requested service property.

13. The computer device of claim 10, wherein when determining that the communication tunnel should be updated, the processor is further configured to:
receive an indication from the service registry that the first node no longer hosts the first service instance having the requested service property or that the first service instance no longer has the requested service property.

14. The computer device of claim 10, wherein, when determining that the communication tunnel should be updated, the processor is further configured to:
determine that another node in the system is a better match for requirements of the requested service property; and
wherein the processor is configured to select the second node in the system that hosts the second service instance having the requested service property based on determining that another node in the system is a better match for the requirements of the requested service property.

15. The computer device of claim 14, wherein, when determining that another node in the system is a better match for the requirements of the requested service property, the processor is further configured to:
   receive an indication from the service registry that the second node hosts the second service instance, wherein the second service instance is a better match for the requirements of the requested service property.

16. A computer device comprising:
   a receiver to receive requests for services in a system having a plurality of nodes;
   a memory to store information relating to a communication tunnel between a client device and a first node of the plurality of nodes;
   a processor configured to:
      receive a request from the client device for a service in the system, the service having a requested service property;
      send a search query that specifies the requested service property to a service registry, wherein the service registry includes a list of services available in one or more nodes of the system;
      receive search results from the service registry, wherein the search results include a list of one or more nodes having the requested service property;
      select the first node, of the plurality of nodes, in the system that hosts a first service instance having the requested service property from the list of one or more nodes having the requested service property;
      establish the communication tunnel between the client device and the selected first node, wherein the communication tunnel includes a first end at the client device and a second end at the first node, wherein, when establishing the communication tunnel, the processor is further configured to:
         generate a tunnel label;
         configure the client device to encapsulate data units with the generated tunnel label; and
         configure the selected first node to encapsulate data units with the generated tunnel label;
      determine that the communication tunnel should be updated based on updated search results received from the service registry;
      select a second node, of the plurality of nodes, in the system that hosts a second service instance having the requested service property, in response to determining that the communication tunnel should be updated and based on the updated search results; and
      move the second end of the communication tunnel from the first node to the second node transparently with respect to the client device, wherein, when moving the second end of the communication tunnel from the first node to the second node, the processor is further configured to:
         configure the selected first node stop encapsulating data units with the generated tunnel label; and
         configure the selected second node to encapsulate data units with the generated tunnel label.

17. The method of claim 7, wherein determining that the communication tunnel should be updated further includes at least one of:
   receiving the updated search results from the service registry, wherein the updated search results include an indication that the first node no longer hosts the first service instance having the requested service property or that the first service instance no longer has the requested service property; or
   receive an indication from the service registry that the first node no longer hosts the first service instance having the requested service property or that the first service instance no longer has the requested service property.

18. The computer device of claim 15, wherein when determining that the communication tunnel should be updated, the processor is further configured to at least one of:
   receive the updated search results from the service registry, wherein the updated search results include an indication that the first node no longer hosts the first service instance having the requested service property or that the first service instance no longer has the requested service property; or
   receive an indication from the service registry that the first node no longer hosts the first service instance having the requested service property or that the first service instance no longer has the requested service property.

19. The method of claim 5, further comprising:
   determining that the communication tunnel should be updated again based on receiving a message from the client device that the second node is unreachable or based on receiving a message from the second node that the second node is unable to provide the second service instance; and
   moving the second end of the communication tunnel from the second node to a third node, in response to determining that the communication tunnel should be updated again.

20. The computer device of claim 15, wherein the processor is further configured to:
   determine that the communication tunnel should be updated again based on receiving a message from the client device that the second node is unreachable or based on receiving a message from the second node that the second node is unable to provide the second service instance; and
   move the second end of the communication tunnel from the second node to a third node, in response to determining that the communication tunnel should be updated again.

* * * * *

UNITED STATES PATENT AND TRADEMARK OFFICE
CERTIFICATE OF CORRECTION

PATENT NO.         : 9,860,325 B2
APPLICATION NO.    : 14/218601
DATED              : January 2, 2018
INVENTOR(S)        : Björn Edlund et al.

It is certified that error appears in the above-identified patent and that said Letters Patent is hereby corrected as shown below:

In the Claims

Claim 17, Column 28, Line 14 should read "receiving an indication from the service registry that the first"

Signed and Sealed this
Twenty-fourth Day of April, 2018

Andrei Iancu
*Director of the United States Patent and Trademark Office*